(12) United States Patent
Nixon et al.

(10) Patent No.: US 11,137,745 B2
(45) Date of Patent: Oct. 5, 2021

(54) OPEN ARCHITECTURE INDUSTRIAL CONTROL SYSTEM

(71) Applicant: FISHER-ROSEMOUNT SYSTEMS, INC., Round Rock, TX (US)

(72) Inventors: Mark J. Nixon, Round Rock, TX (US); Juan Carlos Bravo, Leander, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 160 days.

(21) Appl. No.: 15/966,201

(22) Filed: Apr. 30, 2018

(65) Prior Publication Data

US 2018/0321662 A1 Nov. 8, 2018

Related U.S. Application Data

(60) Provisional application No. 62/500,198, filed on May 2, 2017, provisional application No. 62/492,895, filed on May 1, 2017.

(51) Int. Cl.
*G05B 19/418* (2006.01)
*G05B 19/042* (2006.01)
(Continued)

(52) U.S. Cl.
CPC ..... *G05B 19/4186* (2013.01); *G05B 19/0421* (2013.01); *G05B 19/4183* (2013.01);
(Continued)

(58) Field of Classification Search
CPC ............ G05B 19/0421; G05B 19/0426; G06F 13/4022; G06F 21/44
See application file for complete search history.

(56) References Cited

U.S. PATENT DOCUMENTS 7,684,875 B2    3/2010  Jundt et al.
8,332,567 B2 *  12/2012 Burr ...................... H04L 12/413
                                                    710/315
(Continued)

FOREIGN PATENT DOCUMENTS

EP      2 829 931 A2    1/2015
WO   WO-2017/065460 A1  4/2017

OTHER PUBLICATIONS

International Search Report and Written Opinion for Application No. PCT/US2018/030110, dated Aug. 9, 2018.
(Continued)

*Primary Examiner* — Getente A Yimer
(74) *Attorney, Agent, or Firm* — Marshall, Gerstein & Borun LLP

(57) ABSTRACT

An industrial control system, such as a process control for use in a process plant, uses a hardware/software architecture that makes the system more reactive by making the system more resilient, responsive, and elastic. The industrial control system includes one or more distributed input/output (I/O) controller devices (BFN I/O controllers) which are coupled to field devices within a plant and provide direct or indirect access to the field devices for control and messaging purposes, one or more advanced function and computation nodes, and one or more user nodes coupled to the BFN I/O controllers via a network connection. The advanced function nodes store and execute virtual machines, devices, or entities, which decouples the hardware used in the control system from the software that functions on that hardware, making the system easier to scale, reconfigure, and change. Moreover, the industrial control system uses a self-describing data messaging scheme that provides both the data and a description of the data from a sender to a receiver, which enables different messaging protocols and data formats to be (Continued)

used in the control system, which also makes the system more open.

42 Claims, 13 Drawing Sheets

(51) Int. Cl.
    *G06F 13/364* (2006.01)
    *G06F 13/40* (2006.01)
    *G06F 13/42* (2006.01)

(52) U.S. Cl.
    CPC . *G05B 19/41845* (2013.01); *G05B 19/41885* (2013.01); *G06F 13/364* (2013.01); *G06F 13/4072* (2013.01); *G06F 13/4226* (2013.01)

(56) References Cited

U.S. PATENT DOCUMENTS

| | | | |
|---|---|---|---|
| 8,762,618 B2 | 6/2014 | Burr et al. | |
| 8,977,851 B2 | 3/2015 | Neitzel et al. | |
| 9,083,548 B2 | 7/2015 | Holmes et al. | |
| 9,411,769 B2 | 8/2016 | Erni et al. | |
| 9,495,313 B2 | 11/2016 | Burr et al. | |
| 9,869,984 B2 * | 1/2018 | Tsuchiya | G05B 19/0421 |
| 2010/0222896 A1 * | 9/2010 | Braun | H04L 63/10 |
| | | | 700/20 |
| 2012/0297461 A1 * | 11/2012 | Pineau | G07C 9/27 |
| | | | 726/4 |
| 2015/0046701 A1 * | 2/2015 | Rooyakkers | H04L 9/3263 |
| | | | 713/156 |
| 2015/0154136 A1 * | 6/2015 | Markovic | H04L 12/6418 |
| | | | 710/317 |
| 2016/0226162 A1 | 8/2016 | Erni | |
| 2018/0203818 A1 * | 7/2018 | Fukuda | G06F 13/4022 |
| 2019/0041824 A1 * | 2/2019 | Chavez | G06F 11/2023 |

OTHER PUBLICATIONS

Honeywell Process Solutions, "Virtualization Reduces the Cost of Supporting Open Industrial Control Systems," (2009).
International Preliminary Report on Patentability for Application No. PCT/US2018/030110, dated Nov. 5, 2019.

* cited by examiner

| Name | Type | Description | Needs Downloading | Device Tag |
|---|---|---|---|---|
| CHM1-01 | AI Generic CHARM | | No | CFC-2CHM1-01 |
| CHM1-02 | AO Generic CHARM | | No | CFC-2CHM1-02 |
| CHM1-03 | DI Generic CHARM | | No | CFC-2CHM1-03 |
| CHM1-04 | DO Generic CHARM | | No | CFC-2CHM1-04 |
| CHM1-05 | AI Generic CHARM | | Yes | CFC-2CHM1-05 |
| CHM1-06 | AO Generic CHARM | Stream Value | No | CFC-2CHM1-06 |

OPEN ARCHITECTURE INDUSTRIAL CONTROL SYSTEM

RELATED APPLICATIONS

This is a regular filed application that claims priority to and the benefit of the filing date of U.S. Provisional Patent Application Ser. No. 62/492,895, entitled "Open Architecture Industrial Control System" which was filed on May 1, 2017, and U.S. Provisional Patent Application Ser. No. 62/500,198, entitled "Open Architecture Industrial Control System" which was filed on May 2, 2017, the entire disclosures of which are hereby expressly incorporated by reference herein.

TECHNICAL FIELD

This patent application relates generally to industrial and process control systems and, more particularly, to an open architecture industrial control system that provides for reliability, resiliency, responsiveness, and elasticity.

BACKGROUND

Process or industrial control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc., to control one or more process executing within the process plant or system. Smart field devices, such as the field devices conforming to the well-known FOUNDATION® Fieldbus protocol may also perform control calculations, alarming functions, and other control functions commonly implemented within the controller. The process controllers, which may be centrally located but which may also be located within the plant environment in a distributed manner, receive signals indicative of process measurements made by the field devices and/or other information pertaining to the field devices and execute a controller application that runs, for example, different control modules that make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available from the controllers over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices execute applications that may, for example, enable an engineer to configure the process or an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and to download these process control modules via a data highway to dedicated distributed controllers. Typically, these control modules are made up of communicatively interconnected function blocks, which are objects in an object-oriented programming protocol that perform functions within the control scheme based on inputs thereto and that provide outputs to other function blocks within the control scheme. The configuration application may also allow a configuration designer to create or change operator interfaces that are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communication bandwidth, and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

In any event, the current architecture of industrial control systems, such as process control systems, is largely hardware driven, in that various functions, such as control functions, input/output (I/O) functions, user interface functions, etc. are performed in and are tied to specific pieces of hardware (e.g., user workstations, process controllers, dedicated I/O devices, field devices, etc.) and remain in the specific hardware at all times. This architectural design limits the resiliency, responsiveness, and the elasticity of the control system as these systems are hard to change or reconfigure quickly, are tightly tied to proprietary hardware used to implement proprietary control software, require hardware redundancy on a device by device basis that can be expensive to implement, and are not easily scalable without adding additional hardware that needs to be configured in particular manners.

SUMMARY

An industrial control system, such as a process control for use in a process plant, uses a hardware/software architecture that makes the system more reactive by making the system more resilient, responsive, and elastic. More particularly, the industrial control system, to a large extent, decouples the hardware used in the control system from the software that functions on that hardware, making the system easier to scale, reconfigure, and change. Generally, the new industrial or process control system includes one or more basic function node (BFN) input/output (I/O) devices which are coupled to field devices within a plant and which provide direct or indirect access to the field devices for control and messaging purposes. The system also includes one or more advanced function nodes (AFNs), and one or more user or other compute nodes coupled to the BFN I/O devices and the AFNs via a network connection, such as an open protocol network like an Ethernet bus or switch.

Each of the BFN I/O devices (also referred to as BFN controllers) may include a front-end processor (which may be a multi-core processor) connected to dedicated I/O hardware that, in turn, provides or implements communication channels or bus connections to various field devices within the plant, using any of the various field device protocols that currently exist for field devices. The advanced function nodes may include one or more processing devices, such as one or more servers, that are coupled together or that are connected together at a particular node to perform higher level processing activities, such as control processing, data analytics processing, alarm and alert processing, data storage, etc. The advanced function nodes may have various virtual devices such as virtual controllers, virtual Ethernet devices, virtual protocol and control translation devices, virtual data analytic devices, etc. disposed and executed therein. However, each of or various groups of the virtual devices (e.g. which may be implemented in software run on generic processing hardware within the advanced function nodes) operate as standalone devices that run independently of the other virtual devices within the advanced function node and the BFN I/O devices. Still further, the system may include one or more other computer nodes which may implement user workstations, data historians, configuration databases, etc.

The devices, including the virtual devices or elements within each of the nodes (e.g., the basic function nodes, the advanced function nodes and the other compute nodes) communicate with each other using data messaging in which the transmitting devices or elements (also referred to as actors) send data messages to other virtual devices or actors using a message formatting and addressing scheme that is hardware device location independent, i.e., in which the communication addressing scheme does not specify or is not dependent upon the hardware device or the location of the hardware device (e.g., server, processor, etc.) that is hosting the intended recipient of the message. For example, the data messages may be sent to addresses associated with other virtual device or elements without specifying the hardware location or network location of those virtual devices, which enables the virtual devices to be moved from one hardware location to another hardware location (e.g., between different processing devices at a particular advanced function node, or between different hardware devices of different advanced function nodes) without any disruption in communications, and without needing to reconfigure the control system to implement such location changes.

Still further, the data messaging scheme can be uni-directional and can be protocol agnostic or independent meaning that each virtual device or element (both within the BFN I/O controllers and the advanced function nodes) can use any desired communication protocol or packet structure and any desired data format within the messages to send messages between elements and hardware devices over the network connection. Generally speaking, the data messaging structure may be self-describing in that this data messaging scheme provides for data messages that include the data to be transmitted and data format (or metadata) messages that define or identify the structure of the data in the data message and/or the message protocol to use to decode the data message. The data messages and data format messages may be sent separately and at different times to enable the addressee of a message to understand the format and communication protocol of the data message in order to decode, interpret and use the data within the data message. In some cases, each advanced function node may include a controller or other translation service (which may be a virtual machine or device) that performs data interpretation and decoding of messages sent to the virtual controllers or other virtual elements within the advanced function node.

These aspects of the data messaging protocol enable virtual elements to be hardware location independent, meaning that the control system elements can be moved or placed in different hardware devices (e.g., different processing devices) either at a single node (which may include multiple servers or blades) or at different nodes without needing to reconfigure the control system elements. This feature enables more robust and less expensive redundancy provisioning because this feature enables virtual devices to be moved to any available hardware device when the hardware device on which the virtual device is running fails, becomes overloaded, or is needed for other reasons. Still further, these aspects of the data messaging protocol of the new control architecture enables virtual devices or elements to send and receive data messages of any desired format or message protocol, without needing all of the virtual devices or elements in the control system to use the same protocol or message or data format. Thus, for example, different virtual controllers or virtual control elements can use any desired communication protocol and/or data format to communicate to other virtual devices or virtual elements within the same node or within different nodes over a common communication network. This features enables the interoperability of virtual devices or elements provided by different manufacturers in the same control system or network.

Still further, the control system architecture may use an actor model to perform communications within the system. Using the actor model, each control entry or other virtual entity in the system may be a separate actor that operates independently of all of actors in the system. Each actor is configured to use uni-directional messaging (using the self-describing message protocol referred to herein for example) to send messages to downstream actors via addresses that specify the receiving actors, not the hardware locations at which the receiving actors execute. As a result, each actor is a self-contained entity that operates asynchronously with other actors in execution and communications. This feature means that individual actors can be moved around in hardware (for load balancing, fault toleration, and redundancy purposes) without reconfiguring the rest of the control system or the other actors in the control system, for example, without notifying the other actors. Moreover, using an actor model in this manner enables reconfiguration activities to be performed on some actors in a message stream or thread without reconfiguring or changing the other actors, making updating the system easier and more resilient.

In one embodiment, an industrial control system having a plurality of field devices that perform physical functions within an industrial environment includes an input/output node including an input/output processor coupled to the plurality of field devices within the industrial environment; one or more virtual controller nodes, each of the one or more virtual controller nodes including one or more processors, a memory, one or more virtual controllers stored in the memory and executable on the one or more processors to perform control of the field devices within the industrial environment, and a supervisor stored in the memory and executable on the one or more processors to manage the operation of the one or more virtual controllers at the node; and a communication network, that connects the input/output node to each of the one or more virtual controller nodes. The input/output processor receives device signals from one or more of the field devices within the industrial environment, processes the device signals and places the processed device signals on the communication network for delivery to the one or more virtual controllers and receives control signals from one or more of the virtual controllers via the communication network, processes the received control signals, and sends the processed control signals to one or more of the field devices in the industrial environment.

If desired, the one or more virtual controller nodes includes a plurality of virtual controller nodes and the one or more virtual controllers of one of the plurality of virtual controller nodes is movable from the one of the plurality of virtual controller nodes to another one of the plurality of virtual controller nodes without reconfiguring the virtual controller communications. In another case, the one or more virtual controllers are movable from one location of the memory of a virtual controller node to another location in the memory of the virtual controller node without reconfiguring the virtual controller communications. Additionally, at least one of the virtual controller nodes may include a plurality of different memory devices and the one or more virtual controllers may be movable from one of the plurality of memory devices of the at least one of the virtual controller nodes to another one of the plurality of memory devices of the at least one of the virtual controller nodes without reconfiguring the virtual controller communications.

Likewise, the input/output node may include a virtual input/output routine coupled to a physical input/output device in the industrial environment to receive device signals from field devices via the physical input/output device in the industrial environment. The input/output node may also or instead include a virtual input/output routine coupled to receive device signals directly from field devices in the industrial environment, wherein the virtual input/output routine executes on a general purpose processor within the input/output node to perform input/output signal processing on device signals from the field devices and on control signals delivered to the field devices. Also, the input/output node may include a virtual input/output routine that communicates device signals to the virtual controllers in the virtual controller nodes using a self-describing communication scheme, and/or using a plurality of different communication protocols, and/or using a hardware location independent communication addressing scheme.

Additionally, the input/output node may further include a control routine stored on the memory of the input/output node and that executes on the processor of the input/output node to use one or more of the device signals to produce one or more control signals for controlling one of the field devices in the industrial environment. In this case, the virtual controllers in the one or more virtual controller nodes may perform control routine executions at or less than a first rate, and the control routine in the input/output node may perform control routine executions at a second rate greater than the first rate. In one embodiment, the second rate may be equal to or greater than five times the first rate.

Likewise, the input/output node includes a virtual input/output communication routine that multiplexes device signals onto the communication network, that receives device signals from a plurality of field devices, via a plurality of different communication protocols, and that multiplexes the device signals on the communication network using a self-describing communication scheme, and/or that receives device signals from a plurality of field devices via a plurality of different communication protocols and multiplexes the device signals onto the communication network using the plurality of different communication protocols and using a self-describing communication scheme. The self-describing communication scheme may include device signal data including the device signals in a first communication protocol and protocol description signals describing the first communication protocol.

Also, if desired, the supervisor of the virtual controller nodes may perform load balancing of the processors in the virtual controller node and the supervisor of at least one of the virtual controller nodes may be configured to move a virtual controller from one processor to another processor at the virtual controller node without reconfiguring the virtual controller communications for the virtual controller.

In another embodiment, an industrial control system having a plurality of field devices that perform physical functions within an industrial environment includes an input/output node including an input/output processor coupled to the plurality of field devices within the industrial environment via one or more communication channels; a plurality of controller nodes, each of the controller nodes including one or more processors, a memory, one or more controllers stored in the memory and executable on the one or more processors to perform control of the field devices within the industrial environment, and a supervisor stored in the memory and executable on the one or more processors to manage the operation of the one or more controllers at the controller node; and an open protocol communication network that connects the input/output node to each of the one or more controller nodes using an open communications protocol. Here, the input/output processor receives device signals from one or more of the field devices within the industrial environment, places the device signals on the communication network using an open communications protocol for delivery to the one or more controllers, and receives control signals from one or more of the controllers via the communication network and sends the control signals to one or more of the field devices in the industrial environment.

The open protocol communication network may be an Ethernet communication network, and/or may use a TCP/IP packet based network communication scheme. Also, the input/output node may communicate device signals to the controllers at the controller nodes by sending data in a plurality of different communication protocols via packets configured according to the open communications protocol, and/or using a hardware location independent communication addressing scheme.

In another embodiment, an industrial control system having a plurality of field devices that perform physical functions within an industrial environment includes an input/output node including an input/output processor coupled to the plurality of field devices within the industrial environment via one or more communication channels, a plurality of controller nodes, each of the controller nodes including one or more processors, one or more memories, one or more controllers stored in the one or more memories and executable on the one or more processors to perform control of the field devices within the industrial environment, and a communication network that connects the input/output node to each of the one or more controller nodes. In this example, the input/output processor receives device signals from one or more of the field devices within the industrial environment, and places the device signals on the communication network using a hardware location independent communication addressing scheme.

DETAILED DESCRIPTION

Figure 1:
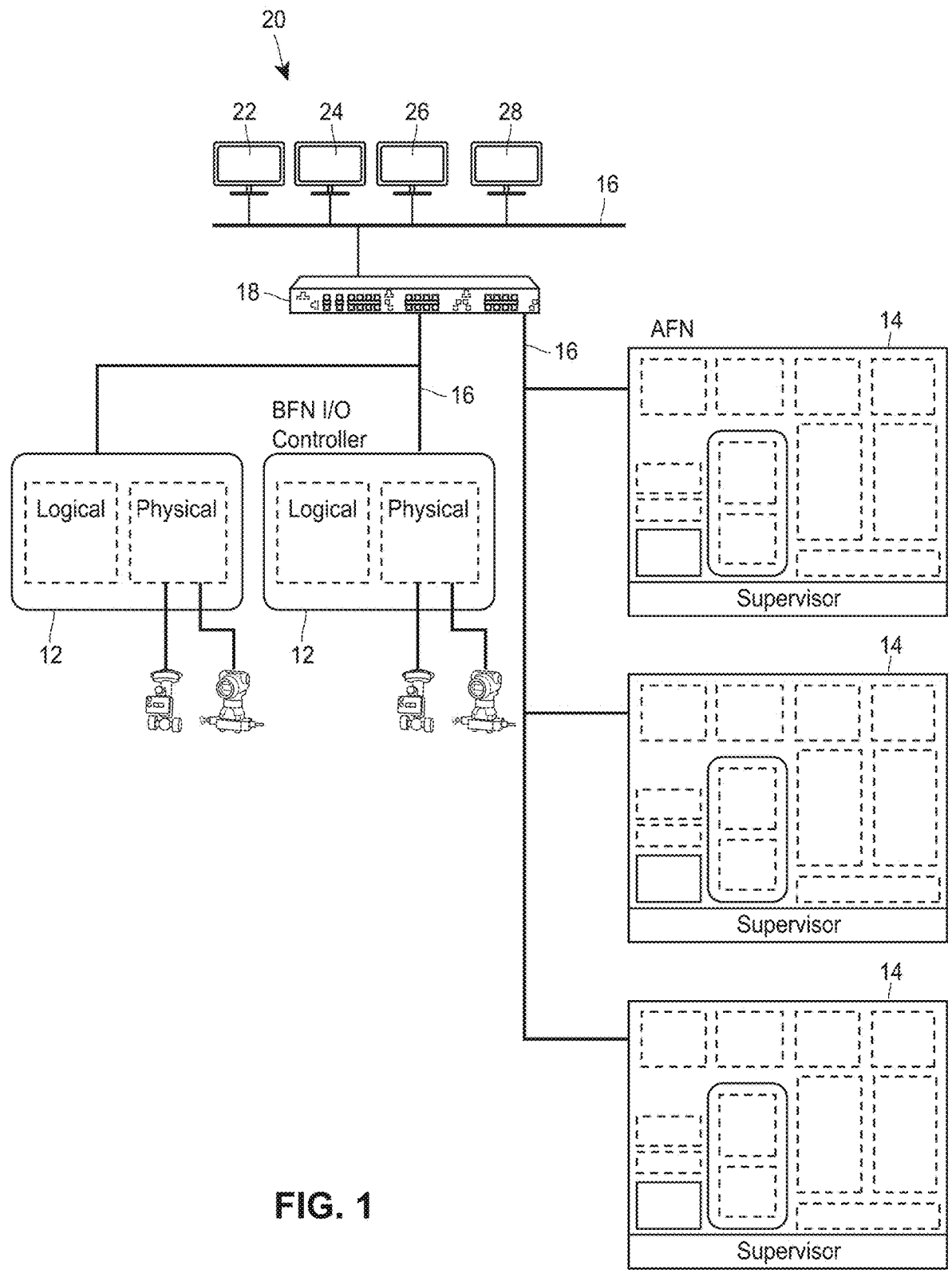
FIG. 1 is a block diagram of an example industrial or process control system architecture having multiple BFN I/O controllers or devices, multiple advanced function nodes and other compute nodes, such as user workstation nodes, communicatively connected via a common communication network.

FIG. 1 is a block diagram of an example architecture of an industrial control system 10, such as a process control system used in a process plant. The example industrial control system 10 (also referred to herein as a process control system 10) includes one or more basic function node (BFN) input/output (I/O) controllers or devices 12 coupled to one or more advanced function nodes 14 via a network 16. In this case the network 16 is illustrated as an Ethernet network having a switch 18, but the network 16 could be other types of networks, including any open protocol network such as any packet-based network, like any IP network (e.g., any network that uses a TCP/IP protocol). As illustrated in FIG. 1, the process control network 10 includes various other compute nodes 20 communicatively connected to the network 16 bus. The compute nodes 20 may, for example, include operator or user workstation nodes (22, 24), a configuration node 26, one or more data historian or database nodes 28, and any other nodes that implement typical hardware devices used in process control plants or systems.

Generally speaking, each of the BFN I/O controllers 12 is a computing platform that connects the process control system 10, and in particular the advanced function nodes 14 to various field devices in the plant being controlled, such as to sensors, valves, and other measurement and control devices. Each of the BFN I/O controllers 12 includes a front-end processor or fast controller coupled to one or more I/O sub-networks or devices, which may be traditional I/O sub-networks including I/O devices such as HART, Foundation Fieldbus, CAN, Profibus, WirelessHART, etc. I/O devices. The I/O devices are of course coupled to I/O channels or buses which connect to various field devices in the plant for the purposes of data collection and control, i.e., to receive device signals from the field devices and to process those device signals such as to interpret the signals, perform data protocol conversion or protocol tunneling on the signals, etc. Still further, the BFN I/O controllers 12 may be coupled directly to field devices using any desired communication protocol structure, such as any of the HART, WirelessHART, Foundation Fieldbus, 4-20 milliamp, CAN, Profibus, or other known protocols. The BFN I/O controllers 12 include a physical component that provides communication connections (which may be logically configurable connections) to various hardware, e.g., field devices, within a plant or system being controlled, and include a logical component that may perform communication activities between the network 16 and the sub-networks and which may, in some cases, implement control activities, such as fast control activities. However, the physical and logical components of a particular BFN I/O controller 12 are generally tightly coupled together to form a single node from the standpoint of the network 16. In a general sense, each BFN I/O controller 12 may be proprietary in nature and may be provided by a different manufacturer, but these devices 12 will perform communications in a manner discussed below to enable networked communications to various different types of I/O devices (even proprietary devices) while still enabling interoperation of the BFN I/O controllers 12 in the same process control network. Likewise, as will be understood, the input/output devices in the nodes 12 may receive control signals from one or more controller, e.g., the virtual controllers described below, and may process these control signals (e.g., to convert or package these control signals into signal formats that can be sent to the field devices) and may provide the processed control signals via the input/output lines to the field devices to perform control of the field devices and thus the plant.

The advanced function nodes 14 may include generalized computing processing hardware or banks of processing hardware, such as one or more servers in a server farm at each node 14. Generally speaking, the advanced function nodes 14 have a communication interface to the network 16, a supervisor, and various virtual devices or services executing in the hardware of the node to perform control and other functions, such as data analytics, configuration functions, maintenance functions, data storage functions, etc. The supervisor (also referred to herein as a hypervisor) may coordinate the operation of the various other virtual or logical devices, including various virtual controllers, virtual Ethernet BFNs, data translation services, communication services, etc. operating within an advanced function node 14. The supervisor may also move or actively schedule the other logical or virtual devices within the hardware of the advanced function node 12 to provide load balancing and redundancy services within a particular advanced function node 12.

Still further, the various other compute nodes 20 may interface with the network 16 and, in particular, with the BFN I/O controllers 12 and the advanced function nodes 14 to perform other control activities, such as user interface activities, network and process control system configuration activities, data collection and storage activities, data analytics, etc. However, in many cases, the other compute nodes 20 may include or run thin client devices that interface with virtual devices or entities within the other nodes, and in particular within the advanced function nodes 14, to provide information to users and to enable users to interface with control, maintenance, data analytics, alarming and other functions executed within virtual devices in the advanced function nodes 14.

Figure 2:
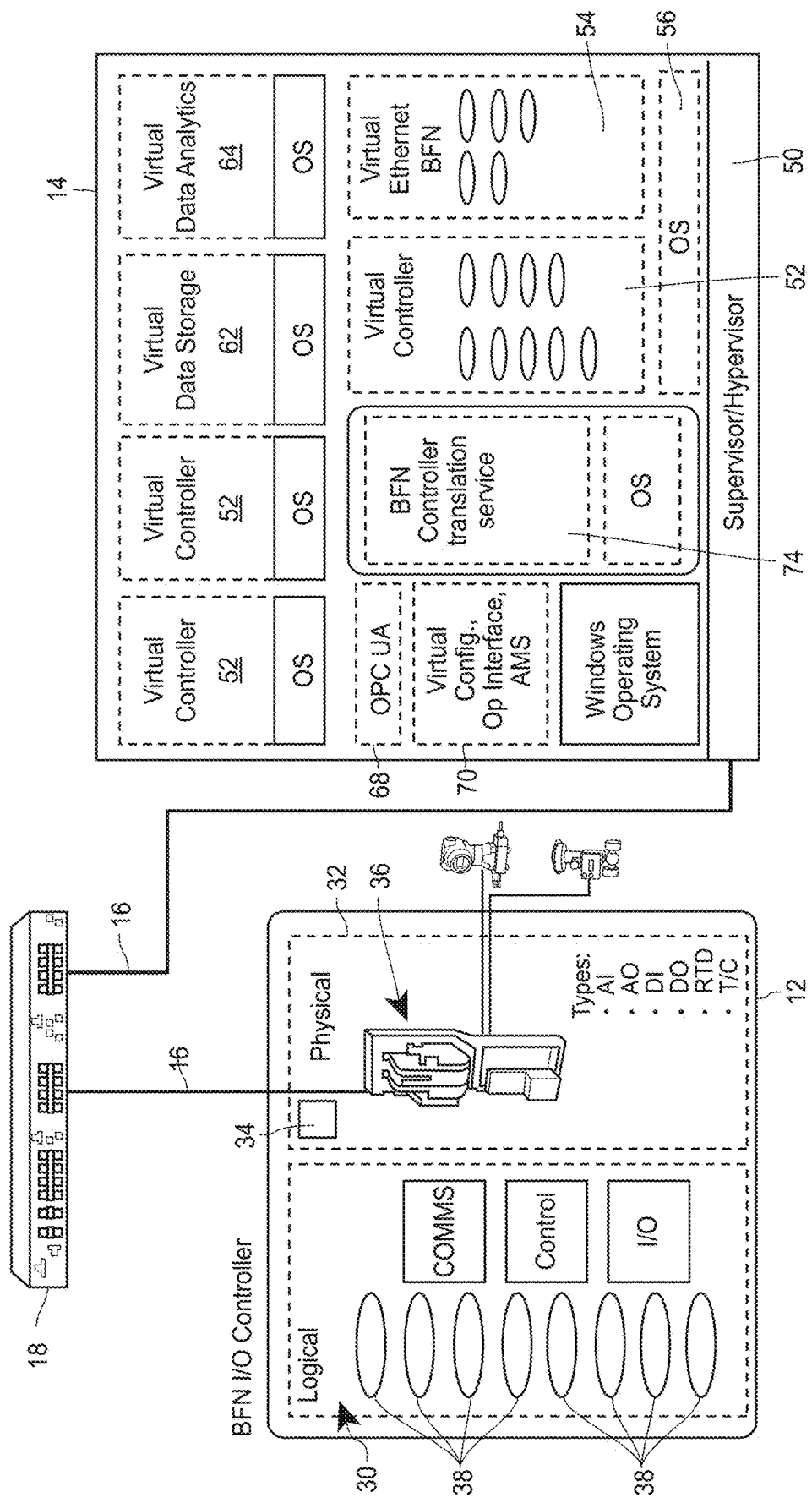
FIG. 2 is a block diagram illustrating a more detailed example arrangement of virtual devices and elements within a BFN I/O controller and a single advanced function node of FIG. 1.

FIG. 2 illustrates one of the BFN I/O controllers 12 and one of the advanced function nodes 14 connected via the switch 18 of the network 16, in more detail. As illustrated in FIG. 2, The BFN I/O controller 12 includes a logical component 30 (which includes software routines and modules that are executed on a processor within the BFN I/O controller 12) and a physical component 32 which includes one or more processors 34 (which can be general purpose processors, ACICs, programmable logic arrays, reprogrammable gate arrays, programmable logic controllers (PLCs), etc.) and various physical I/O connectors 36 for use in connecting the BFN I/O controller 12 to field devices or other devices within the plant or system being controlled. The physical I/O connectors 36 can be any desired types of I/O connectors, including standard 4-20 ma connectors, bus based connectors such as Fieldbus, CAN, Profibus, etc. connectors, channel connectors, such as HART connectors, wireless connectors, such as WirelessHART connectors, IEEE wireless protocol connectors, etc. In one case, the I/O connector hardware 36 may include reprogrammable or digitally configurable connectors that enable addressing or tag connections of the field devices and other hardware within the plant to be configured or specified after the connections are made. Examples of such configurable connection I/O structure is described in U.S. Pat. Nos. 7,684,875; 8,332,567; 8,762,618; 8,977,851; 9,083,548; 9,411,769; and 9,495,313 and in U.S. Patent Application Publication No. 2016/0226162, which are expressly incorporated by reference herein, and is referred to herein as CHARMs I/O.

Likewise, as illustrated in FIG. 2, the logical component 30 of the I/O controller 12 may include various service applications, such as a communication application (Comms) which performs communications over the network 16, a control application which may implement or execute control modules stored in the I/O controller 12 to perform, for example, fast control down within the BFN I/O controller 12, and an I/O application which performs communications with the sub-networks (e.g., field devices) via the physical I/O components 32 or 36. As also illustrated in FIG. 2, the logical component 30 may include or store one or more control modules 38, which may be, for example, input control modules (e.g., function blocks), output control modules (e.g., function blocks), control calculation modules or blocks, such as proportional-integral-derivative (PID) or model predictive control (MPC) blocks, alarming blocks, etc. Generally, the BFN I/O controller 12 will operate or execute control modules or blocks therein to perform fast control (e.g., at 10 millisecond cycle times).

As illustrated in FIG. 2, the advanced function node 14 may include a plurality of different hardware devices, such as servers in a server farm, processors and memories on a separate motherboards, etc. with each server or processor component configured as, for example, a different blade or hardware device in a server cabinet. The advanced function node 14 includes a supervisor or hypervisor 50 that controls and supervises the operation of the various other virtual devices or entities within the node 14 as configured or executed on the various hardware devices, as well as providing hardware oversight at the node. The advanced function node 14 may, for example, include one or more operating systems such as the Windows® operating system (OS) which runs as the base OS on the one or more processors of the node 14. Likewise, the advanced function node 14 may include any number of virtual machines, devices, or entities. For example, as illustrated in FIG. 2, the advanced function node 14 includes one or more virtual controllers 52 which may emulate or operate as traditional controllers in process plants to perform control activities. Each of the virtual controllers 52 may include various control modules, function blocks, alarming modules, communication modules, user interface modules, etc. as is typical with standard distributed controllers and these control modules or other structures within the virtual controllers 52 may generate control signals (of any kind) to be sent over the communication network 16 to the node 12 for processing and delivery to the field devices. However, in this case, the virtual controllers 52 run independently of one another and of the other virtual devices or entities within the advanced function node 14 and may run or execute on different processor or server hardware devices in the node 14, and run independently of and communicate with one or more of the BFN I/O controllers 12 via the network 16 to perform control, e.g., to obtain sensor measurements, to generate and send control signals to field devices, to generate and send or process alarm, alerts and other messages from the field devices or from the operator interfaces 22, 24, to perform supervisory control, etc.

Likewise, as illustrated in FIG. 2, the advanced function node 14 may include one or more virtual Ethernet BFN controllers or devices 54 which may perform control or which may track control activities for other distributed control sub-networks coupled to the node 14 via the Ethernet network connection 16. Such sub-networks may include, for example, Modbus networks. As illustrated in FIG. 2, the virtual controllers 52 and the Ethernet BFN controller 54 may run or execute on the same or on separate or different operating systems.

Still further, as illustrated in FIG. 2, the advanced function node 14 may include one more data storage virtual machines 62 which may collect, organize, and store process and/or other data from the virtual controllers 52, 50 and the BFN I/O controllers 12 and sub-networks to which they are attached. If desired, the data storage virtual machine 62 may be a virtual big data appliance or any other types of data storage machine. Moreover, the advanced function node 14 may include one or more virtual data analytic devices 64 which may perform data analytics using, for example, the data collected by the virtual data storage device 62, the virtual controllers 52, 50, the BFN I/O controllers 12, etc. or any other data. Again, each of the virtual machines may be implemented on the same or different general purpose processing hardware within the node 16, such as on any general purpose processor and memory associated with any of the different hardware devices (e.g., servers or motherboards).

Still further, the advanced function node 14 may include a virtual OPC-UA device 68 which performs OPC processing and conversion on data within the network 16 to enable interoperation or interpretation of data from different sources or of devices from different manufacturers. The advanced function node 14 may also include one or more virtual configuration, virtual operator interface, virtual control interface, virtual maintenance interface applications, etc. 70. The virtual devices 70 may implement standard operator control activities (including user interfacing), configuration activities (including user interfacing), maintenance activities (including user interfacing), alarm processing and display activities, etc., and these virtual devices 70 may interface with the user workstations or thin clients 22, 24, 26, etc. via the network 16 to interface with users in the plant or system 10.

Still further, the advanced function node 14 may include a BFN controller translation service or machine 74. Generally speaking, the controller translation service or machine 74 performs data translation services for data flowing between, for example, the BFN I/O controllers 12 and the virtual controllers 52 in the advanced function node 14. As will be discussed in more detail below, these data translation services 70 enables communications over the network 16 to be protocol independent, i.e., the translations services 70 enables different devices, virtual devices, logical entities, and virtual entities within the control system 10 to use any communication protocol and any data format desired, and still perform communications over the network 16. This feature also enables the control system 10 to be open architecture in the sense of the choice of communication protocols and data formats to use in performing communications between the BFN I/O controllers 12 and the advanced function nodes 14.

As will be understood, each of the virtual machines or devices within the node 14 may have their own (and different) operating system and thus may run independently of the other virtual devices. Moreover, the design and configuration of the various virtual machines within the advanced function node 14 need not be coordinated with one another, and thus may be provided by different manufacturers, making the design of the node 14 open architecture. Still further, each of the virtual devices or entities within a single advanced function node 14 may run or may be executed on the same or a different physical server or processing device within the node 14 and may be moved (by the hypervisor 50, for example) between physical hardware or processing devices within the node 14 without needing to reconfigure the other virtual devices or the node 14 itself, and with only limited or minimal downtime for the virtual device being moved. This feature enables the hypervisor 50 to move virtual devices between physical hardware or servers at the node 14 to balance loads at the node 14, to perform redundancy reconfiguration or switchover in case one of the hardware devices fails, to enable temporary high load processing by a particular virtual device without significantly effecting the operation of other virtual devices at the node 14, etc.

Thus, the new open architecture industrial control system of FIGS. 1 and 2 includes a distributed architecture where one or more basic function node (BFN) input/output (I/O) controllers or devices 12 and one or more control supervisors or advanced function nodes 14 are coupled via a network 16 and each can support a range of functions including I/O services, device services, control services, and common services. The system 10 includes a combination of hardware and software wherein the hardware for the BFN I/O controller 12 includes a configurable smart logic solver (CSLS), a configurable I/O carrier, various configurable I/O modules and supporting cables and power supplies. The system 10 also includes the supervisory controller 14 that is used to provide an open system (e.g., OPC-UA) interface 68, a controller translator layer 70, and other features. The supervisory controller node 14 and other parts of the system 10 can be virtualized and packaged as part of the configurable virtual system or installed and run as standalone hardware.

It will be understood that the basic function nodes 12 can be used, in the most basic form, with a single device or even with a single measurement, and so the basic function nodes 12 do not have to multiplex I/O in all cases. Moreover, the basic function nodes 12 can also provide translator services for other devices, for example, for Ethernet IP devices, when those devices do not support open protocols. As further examples, the basic function nodes 12 could provide translator services for other devices like weigh scales, NIR devices, gauging systems, etc.

Still further, the control system architecture described herein could be extended to allow I/O devices or actual process control or other devices, such as field devices, to connect directly to the network 16 instead of connecting through a basic function node 12. In this case, the devices (e.g., field devices) would support communications with the network protocol and would include one or more, but maybe only a small number, of routines (which could be actors as described below) that can be used for communications, data manipulations, and specific functions such as a valve diagnostics.

The control architecture of FIGS. 1 and 2 is designed to allow applications to be installable on any compute or processor node of the network 16 within the plant control system 10. These applications may be distributed between nodes, or in some cases may be moved between compute nodes, in response to system loading demands and disturbances. The ability to migrate and upgrade applications independently enables the overall system 10 to achieve very significant scaling and uptime statistics. This capability may be referred to as reactive, and may be built on various reactive architectures include Erlang and most recently Akka and Akka.Net.

The new open architecture may also include the use of self-describing data-driven systems or data messaging. With a self-describing messaging approach, both the data and the data descriptions may be stored as part of every component (physical and/or logical or virtual component) in the system 10 and both the data and the data descriptions may be communicated as part of the connection establishment between endpoints of any data communication.

The new open architecture also includes redundancy at the hardware, application, and feature levels. At the hardware level, data may be replicated between systems and, when a hardware failure is detected, whole applications or virtual machines may automatically switchover to other hardware platforms (initiated by the hypervisor 50 for example) with no, or little, loss in timing or data. At the application level, applications may be replicated on different compute nodes or on different servers or physical processing machines within a node (again as initiated by the hypervisor 50), and may be migrated between devices or nodes with no loss in connections. At the feature level, features such as measurements may be backed up with other measurements or in the more general case, with soft sensors. The system 10 may also perform measurement reconciliation as part of basic architecture of the control system.

Still further, the new open architecture may include data-driven interfaces. With data-driven interfaces, the endpoints are able to query the components for the data they are interested in without having to know the details of the implementation. Taking this a step further, query driven and functional style interfaces may be used to access data across subsystems which are physically separated. Likewise, as noted above, in this control system architecture, hardware computing resources may be clustered and virtualized to provide very scalable hardware platforms and these virtualization systems may use technologies such as Docker to install and execute applets.

Moreover, the open system architecture is designed to allow applications to be installable on any compute node in the system 10. These applications may thus be distributed between nodes 12 and 14, or in some cases, moved between nodes 12 and 14 in response to system loading and disturbances, for example. The ability to easily migrate and upgrade applications independently enables the overall system 10 to achieve very significant scaling and availability statistics.

By way of background, the distributed control system (DCS) industry was largely enabled by the rise of the microcontroller. As part of the early DCS architectures, operator, controller, and I/O functions were separated into specialized compute platforms and were distributed via proprietary and redundant network technology. Next generation systems, such as the DeltaV™ system by Emerson Automation Solutions, have extended these concepts both in allowing control functions to run on almost any node and by allowing compute capability to be utilized at any point in the system, most recently out at the I/O itself in terms of the CHARMS™ technology. DeltaV also embraced IT-based technology such as Ethernet, switches, TCP/UDP/IP, and common operating systems such as Windows and Linux. Although systems such as DeltaV allow control to be run anywhere, the architectures still enforce functions to be run on specific compute boxes or machines.

Moreover, to achieve very high up-times and support failure scenarios and to provide on-line upgrade scenarios, control architectures typically provide network redundancy, controller redundancy, I/O redundancy, and application station redundancy all on a hardware specific basis. Although this redundancy has largely met its goals, it makes scale-up of control applications difficult. In particular, control applications must be manually reallocated and installed or "downloaded" into the system. Furthermore, the rise of remote monitoring, fault detection, and other applications has further increased the load on these DCS architectures. Many of these requirements are driven by the so-called IoT or IIoT requirements.

The answer to some of these problems, as used in the system described herein, is in part, the use of multi-core processors, the use of the emerging network messaging passing technology, such as Time-Sensitive Networks (TSNs), programmable platforms such as FPGAs, data-driven techniques, and message driven systems. One manner to make use of multi-core platforms has been through virtualization, and most recently container-based virtualization such as Docker. Virtualization and container-based virtualization has been adopted in many industries. However, one important approach that may be used in the open architecture control system of FIGS. 1 and 2 utilizes an actor-based method (this is a common term in the computer science industry). This actor-based approach makes the system 10 more reactive, and reactive application development is a significant paradigm shift.

In general, the principles of a reactive system are designed to achieve a system that is more responsive, resilient and elastic, particularly though the use of message handling. More particularly, a responsive system is able to respond to changes in compute needs, failures, and user requests as quick as possible, which ensures that the applications and users are not spending significant amounts of time idly waiting for operations to complete. For example, for an application to be responsive, the application needs to be able to react to an increased spike in usage. These spikes may be driven by a user request to perform some form of anomaly detection, or by something as simple or common as the user pulling up a series of dashboards (user interfaces) showing data from across the system. In the event that the usage of the application doubles, then the response time of the application should not also double. The easiest way to manage responsiveness is to create a system that allows for easy scalability to react to this increased processing pressure. Providing application processing such that the number of instances of a service can be turned up and down without overloading processor resources in the event of increased application load allows applications to easily react to this and increased processing demand. The system described herein enables this easy scale up based on the virtualization and the message passing schemes used in the system 10.

Moreover, for an application to be usable, the application must withstand a wide range of conditions to which it may be subjected and as such, should be resilient. Applications should be resilient from problems caused by users due to an increased load as well as problems generated from within the application. For example, errors are a common aspect of almost all applications, especially due to the sheer number of data sources that are being combined to create more powerful applications. There is always the possibility that any of these external services could fail, and so it is important to consider what happens when an application encounters an error. In order to ensure resilient applications, the applications must be able to respond to or be resistant to sources of failure.

Likewise, it is also important to consider how systems cope in the event of potential security problems, such as a lack of authorization. As users look at integrating their jobs with more and more services, the system architecture needs to be able to handle failure in these third-party systems. Generally speaking, it is important that, in the case of failure, the entire system does not struggle to cope, or even worse that the whole system fails as a result of a single component failure. Ideally, it is desirable to isolate failures down to the smallest possible unit and encapsulate failure within that unit alone. This design goal helps to ensure that an application is still able to stand in the face of adversity. Given a failure, it is not desirable to force the internal details of a failure onto a user, but instead it is desirable to provide the user with some details that are meaningful to the user. In an ideal scenario, the system 10 should be able to automatically solve issues and allow applications to self-heal. Scalability and resiliency thus both share a strong connection and, in the event that an application is built with scalability in mind, then the application will be better able to handle failures. The reverse of this statement is also true, in that if an application is built with resilience in mind, then the application will be able to handle an increased load.

To provide for a reactive system and, in particular, for reactive applications within the control system of FIGS. 1 and 2, the system 10 may use a particular message passing protocol or architecture that relies on uni-directional messaging between applications or entities in the system and the use of self-describing data protocols for messaging. The message passing architecture may be in the form of asynchronous communications, where data is queued up for a worker to process at a later stage in a fire and forget manner. Using such a uni-directional message passing architecture provides a number of valuable building blocks upon which to create applications that are resilient, scalable and responsive. In particular, the use of a uni-directional message passing architecture provides isolation between components (applications, devices, etc.) Once isolation is achieved, it is possible to deploy the different tasks that need to be performed in the most ideal (hardware) location dependent upon factors such as available CPU power, available memory, the risk of failure, etc. Isolation is a key component for resilience, because in the event that a single component fails, it is possible for the rest of the system to operate without also failing. Isolation also enables the failing component the chance to self-heal over time by either backing off from a dependent service causing issues or restarting in an effort to reset its state.

Moreover, using a uni-directional message passing scheme provides location transparency. More particularly, uni-directional message passing only requires that the sender provide an address of the receiver to send the message. The sender does not need to know the actual location (in the hardware) of the receiver and, as such, the receiver can be located anywhere in the control system and can be moved without the knowledge of the sender. In particular, when the sender sends a message with an address of the receiver, the framework deals with the intricacies of routing the message to the physical location of the service or receiver within a cluster or set of nodes, whether that service is located on the same machine, on a server in the same node, or on a server in a completely different compute platform. This feature allows the framework to dynamically reconfigure the location of a running task without needing to alert the application to this change, allowing for easier scaling. Given a system failure, it is entirely feasible for the framework to redeploy a service into a new location, once again leading to a requirement for location transparency.

Message passing may also be advantageously handled through the use of actor-based concurrency. Examples of this methodology include Erlang and Akka. Both of these techniques implement the actor model which splits the system up into independent actors. An actor within the actor model encapsulates three key concepts; storage, processing and communication. Actors are non-blocking and asynchronous.

Figure 3:
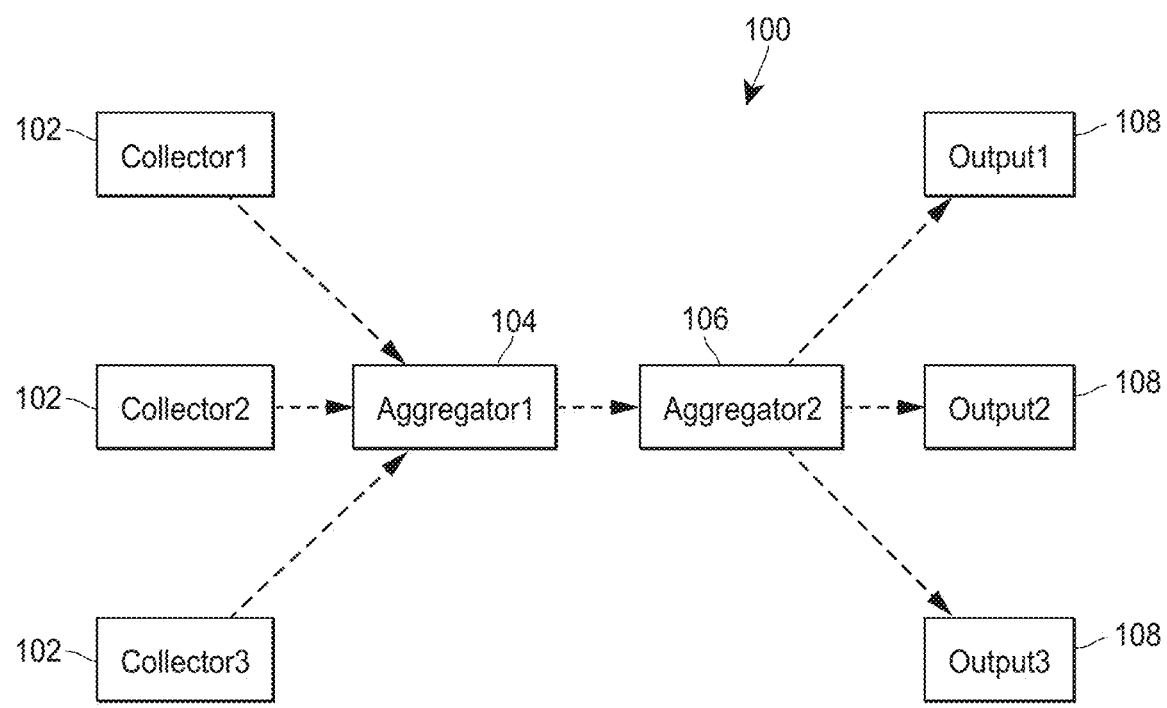
FIG. 3 is a data flow diagram illustrating data flow between different virtual elements within the system of FIGS. 1 and 2.

A DCS is a data-intensive architecture. As a result, very large volumes of real-time data are extracted from measurement devices and this data is used to drive control, user, and enterprise level decisions. A reactive application reacts to the changing world around it. Components, or units of work, thus react to messages which have been propagated by other components earlier in the chain of processing. As a result of this uni-directional, actor based messaging, data flows through the stages of the application as shown in FIG. 3. In particular, FIG. 3 provides an example of a simple dataflow diagram 100 where multiple data collectors 102 provide (or fan in) data to a data aggregator 104, which may then send data to another data aggregator 106, which may then send data to multiple output blocks 108. The data collectors 102 in FIG. 3 may be, for example, sensor measurements or related to AI blocks in a traditional control system. The data aggregator 104 may be a control block or a control module in a traditional control system, the data aggregator 106 may be an alarm handling block in a traditional control system and the output block 108 may be user interfaces, alarm stations, alarm interlocks, etc. of a traditional control system. Of course, the data flow diagram 100 of FIG. 3 can represent many other types of data flow in an industrial or process control system. The arrows in FIG. 3 illustrate how the data flows through the system and it quickly becomes clear that the lack of circular dependencies (i.e., unidirectional flow with respect to data messaging) reduces the overhead required to understand how such a system operates.

In the example of FIG. 3, the system 10 ingests data into the control system (e.g., via a control system protocol, such as a publish/subscribe communication protocol, an HTTP API request, or other some form of telemetry ingestion protocol such as MQTT.) If the data is sensor data, the sensor identifier component (e.g., one of the data aggregators 104 or 106) is responsible for performing aggregation and other processing on the sensor readings and then propagates these readings into the next component. This next component may be a view clients which will then provide the data to a display to display the data, to a historical client which will record the data, and a control application which will take action on the data, and/or some other applications. The key aim when considering dataflow is that operations should avoid relying upon calling backwards in the chain. Instead each service should be able to act correctly dependent upon the data which it has received from the previous element or elements of the chain. This uni-directional data flow ensures that the components are easy to test, the combination is easy to understand for developers who are new to the codebase, and also that the application is able to work in a push based model rather than a pull based model. Once an application exists in a pull based model, it leads to the potential for contention issues as multiple independent services face contention issues as they all fight to retrieve data from the target of the pull operation.

Moreover, in the example of FIG. 3, each of the boxes or objects (e.g., the collectors 102, the aggregators 104 and 106, and the outputs 108) are actors in an actor model. The actor model is a model of computation that is designed as a means of modeling concurrent operations. The actor model relies on the use of message passing between independent entities as a means of abstracting over the low-level concurrency primitives. Erlang is the most noted example of an implementation of the actor model, having been designed by Ericsson to assist in developing highly concurrent applications for telecom purposes. The actor model forms a powerful abstraction which enables the control system described herein to use code in such a way that the system is able to run on machines with any number of cores without having to worry about the details of multithreading, while also making the most of all the resources available on any particular hardware machine.

Another important aspect of the control system architecture described herein is that the data or data messaging between components (e.g., virtual devices, virtual components or entities, hardware devices and actors) is self-describing. To support a self-describing data messaging protocol, the components of the control system 10 must be able to receive both data and data descriptions independently or together. In this manner, the actors can use the data descriptions to first interpret the data being received and to then act on the data.

Figure 4:
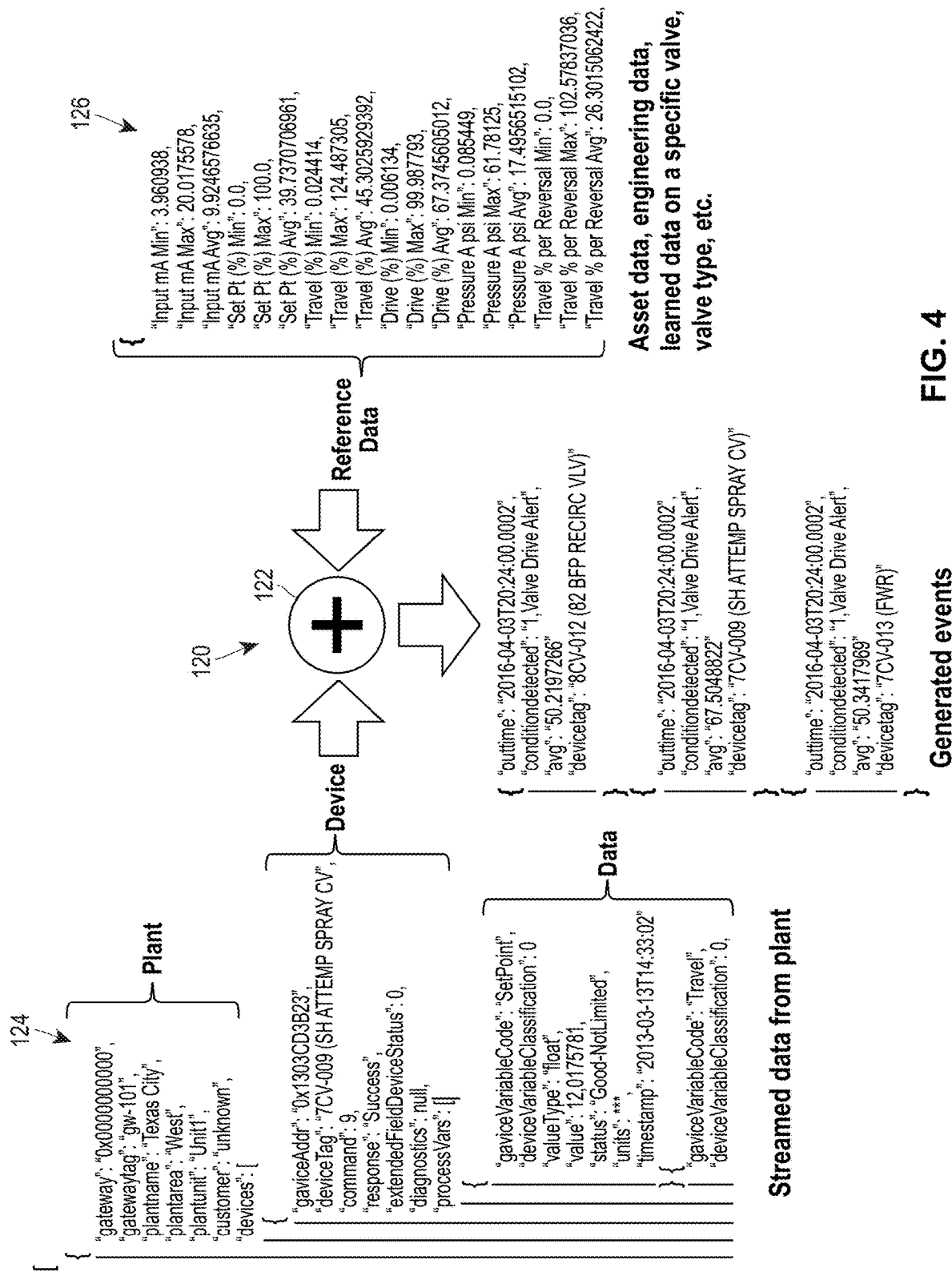
FIG. 4 is a flow diagram illustrating a self-describing data messaging scheme that may be implemented by the various virtual elements in the control systems of FIGS. 1 and 2 to perform location and protocol independent messaging.

A method of sending both data descriptions and data in a self-describing data system is illustrated in more detail in FIG. 4. In particular, as illustrated in the diagram 120 of FIG. 4, an actor 122 receives data from the plant (or another actor within the plant) 124 and also, at the same time or at some other time before or shortly after receipt of the data 124, the actor 120 receives reference data 126 describing the data 124 in a manner that enables the actor 122 to decode and understand the data 124. The data 124 and the reference data (also called metadata) 126 may be, for example, transmitted in compressed form or expanded in JSON form as shown in the example of FIG. 4. However, the data may be expressed or sent in any desired protocol and/or data format. In either case the reference, or meta data 126 is be used by the actor 122 to interpret the data 124 that is being received.

It will be understood that, in the system of FIGS. 1 and 2, the controller translation services machine 74 may perform the data decoding and interpretation for various other virtual devices in the node 14 using the scheme of FIG. 4 when the virtual machines 52, 54, etc. are modeled as actors. Also, it will be understood that the actor based model described herein may be used on virtual devices depicted within the BFN I/O controllers 12 and the virtual devices or entities within the advanced function nodes 14, such at each virtual device or logical component is a separate actor. In this case, the BFN controller translator 74 may perform data decoding based on the self-describing data messaging scheme described herein and provide the interpreted data to one or more of the other virtual machines (e.g., the virtual controllers 52, the virtual Ethernet BFN 54, the data analytics machine 64, etc.) Likewise, the BFN controller translator 74 may provide or conform data messages sent from one of the other virtual machines 50, 52, 62, 64, to external devices (e.g., to the DNC I/O controllers 12) by providing a data description for those devices or messages in combination with the data message sent by a virtual device.

Importantly, however, various ones of or if desired, each of the actual virtual entities within the virtual devices, such as each of the control blocks or modules within the virtual controllers 52, each data analytic block within the data analytic machine 64, etc. may be a separate actor within the actor model. Likewise, in this case, each of the logical entities within the BFN I/O controllers 12 may be separate actors within the actor model. As a result, data translations or data messaging (e.g., using the self-describing data scheme described herein) may be performed by each actor. In this case, the controller translation services machine 74 may not be needed in the advanced function nodes 14 as this functionality is provided by the separate actors.

Likewise, as noted above, if the control system architecture is extended to allow process control or other devices, such as field devices, to connect directly to the network 16 instead of connecting through a basic function node 12, the devices (e.g., field devices) would support communications with the network protocol and could include one or more actors that can be used for communications, data manipulations, and specific functions such as a valve diagnostics to enable such communications. Here, the actors are spread within the control system down to the field device level.

In any event, the actor-based approach may be very well suited for various types of control, including for example, batch control and state-based control. With batch control, each of the actors send messages to other interested actors as the batch proceeds through its recipe. Similarly, with state-based control, or with simple sequencing control for that matter, the actors send messages to other interested actors as the sequence proceeds. There is no need, in these cases, for tightly coupled coordination between actors other than sending messages between the actors. Still further, it will be understood that messages between actors can be of any desired format and protocol and can contain other protocol messages such as a HART or Fieldbus protocol messages. Likewise, the actor-based model can be used even if the communication network is a mesh communication system (based on, for example, a wired or a wireless network or a combination of the two), as the actors can communicate over a mesh network using the same basic principles as used in a bus-based network.

As one example of the use of the actor model as applied to a traditional process control system, each function block in a traditional process control module may be designated to be a separate actor in the actor model, as each actor then executes (asynchronously with respect to the other actors) and sends the results to the next actor in the chain, which drives the functionality down the chain. This mapping works well for cascade process control loops, for example.

Figure 5:
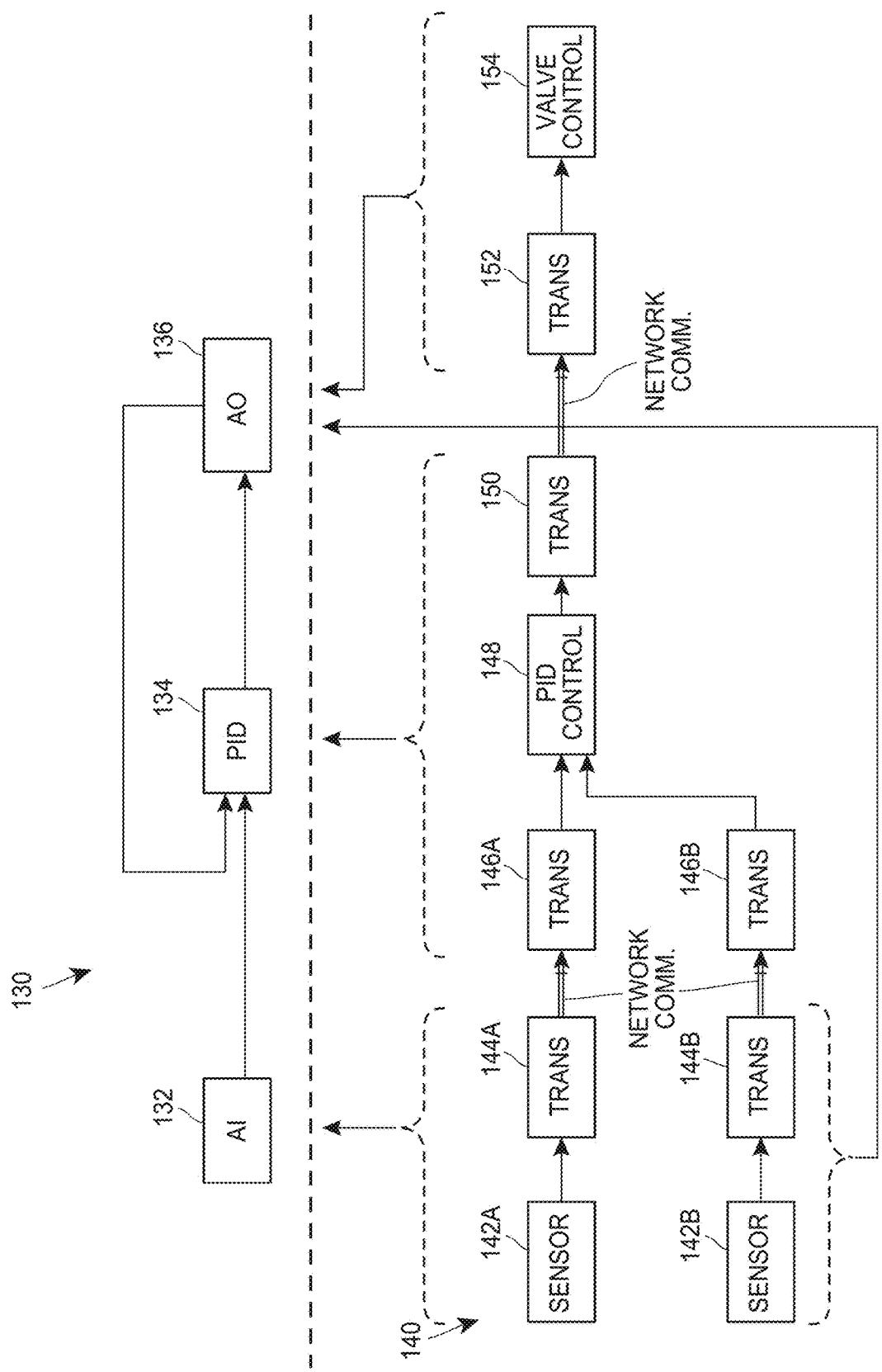
FIG. 5 is an example actor model diagram juxtaposed with a traditional control loop diagram, illustrating a method of implementing an actor based control loop that performs communications of process variable measurements to a PID control element which produces a control signal sent to an output, using the actor based model and the self-describing data messaging scheme described herein.

As another example of applying the actor based model in a process control loop of a process control system, FIG. 5 illustrates one manner of implementing a simple PID control loop 130 separated between one or more of the BFN I/O controllers 12 and one of the advanced function nodes 14. In this example, the process control loop includes an AI (analog input) block 132 disposed in a field device or in one of the BFN I/O controllers 12, which provides a measurement signal to a PID control block 134 implemented in the virtual controller device 52 of an advanced function node 14, which provides a control output to an AO (analog output) block 136 disposed in a valve or in one of the BFN I/O controllers 12 and which receives a feedback measurement of current valve positioning of the valve. In a traditional control system, the blocks 132, 134, and 136 would be proprietary and conform to the same protocol or messaging scheme, and these blocks would be configured to send signals over dedicated or preconfigured communication paths to preconfigured hardware to implement control communications. Because the blocks 132, 134, 136 are all of the same protocol, the sending and receiving blocks know how to read the data messages at all time as these messages conform to the same protocol and data format.

The lower portion of FIG. 5, however, illustrates a manner in which the actor based model would or could be applied to the simple control loop 130 to provide or uni-directional, and self-describing messaging, which enables message protocol and format independence over the network 16 of FIGS. 1 and 2 (and even between actors in the same node or physical machine or processor of a single node). In particular, in an actor based model 140, multiple data collector blocks 142A and 142B are provided to collect the sensor measurement (associated with the AI block 132) and the valve position measurement (associated with the AO block 136). These data collector blocks 142A and 142B may be located in different field devices and/or in the same or different BFN I/O controller devices 12. However, as illustrated in FIG. 5, each of the blocks 142A and 142B is connected to a data translator block 144A and 144B, each of which provides data messaging across the network 12 using a self-describing data protocol. Each of the blocks 144A and 144B may encapsulate the data from the blocks 142A and 142B in the same or in different messaging protocol packets and may provide other meta-data messages that describe the data in the base message (also called a data message). The blocks 144A and 144B may send these message pairs (associated with the self-describing message scheme) across the network 16 addressed to the downstream blocks 146A and 146B which may, in this case, reside in one of the virtual controllers 52 disposed in one of the advanced function nodes 14. It will be noted that the blocks 144A and 144B may use different message protocols and/or different message or data formats, and thus the data collector blocks 142A and 142B do not need to conform to the same proprietary protocol or scheme, but can be provided by completely different manufacturers using different proprietary programming. Moreover, the translator blocks 144A and 144B can send the messages using completely different data formats or meta-data descriptions (from one another, for example) which again makes these blocks more independent and open in usage.

Still further, a second pair of translator blocks or actors 146A and 146B receive the data messages and the meta-data messages from the blocks 144A and 144B, respectively, and use the information therein to decode the data (e.g., sensor measurement data). This decoding process may include determining the message protocol of the message (e.g., the packet format) as well as determining the data format that defines the meaning of the data within the message based on the meta-data message. The translator blocks 146A and 146B then provide the decoded data to a PID control block 148. Note that the translator blocks 146A and 146B can operate independently of each other and of the PID block 148. The PID control block 148, which may institute a proprietary control routine, may use the sensor measurement inputs and produce a control signal at the output thereof. The control signal from the PID control block may be provided to another translator block 150 (a separate actor in the actor model) which may encode the data in a message (a message packet) suitable for communication over the network 16 and may send that data message, along with a meta-data message across the network 16 addressed to a logical entity within one of the BFN I/O controllers 12. The messages are then received by a further translation block 152 in the appropriate BFN I/O controller 12 which decodes the data within the messages received via the network 16 (based on the meta-data and the data within the data message). Again the message decoded by the translator block 152 may be in any message protocol (e.g., any packet based protocol) as sent across the network 16 and may use any message or data format or scheme, as the translator block 152 uses the meta-data to decode or understand the format of the data message. In any event, the translator block 152 then provides the control signal to a control block 154 that may be in, for example, a logical component of one of the BFN I/O controllers 12, or in a field device, etc. to cause, for example, a valve to change position.

As will be noted, each of the blocks 142A, 142B, 144A, 144B, 146A, 146B, 148, 150, 152 and 154 is a separate actor which may operate in the same or different physical hardware. Each of these actors use asynchronous, uni-directional with respect to each other and thus do not perform any pull-based communications. Still further, each of the actors or blocks may transmit data using the self-describing data protocol described herein making the communications protocol and format independent. In some cases, the meta-data messages of the self-describing data protocol may be sent contemporaneously (e.g., slightly before or after) the data message or may be sent periodically or at other non-periodic times to the downstream actor for use by the downstream actor. That is, the meta-data message may not need to be sent as often as the data messages of the self-describing message protocol because the receiving actor can store the meta-data for use in decoding data messages. Thus, the meta-data messages can typically be sent less often than the data messages, and the meta-data messages may be sent only when the meta-data is changed, added to, or otherwise altered and/or to inform new actors added to the system that may receive data messages from a particular upstream actor of the meta-data.

Still further, as illustrated in FIG. 5, the actor based model has actors 142A and 144A which generally correspond to the AI block 132 of the traditional control loop, has actors 146A, 146B, 148 and 150 which correspond to the PID block 134 of the traditional control loop 130, and has actors 142B, 144B, 152 and 154 which correspond to the AO block 136 of the traditional control loop 130. Of course, other actors could be added in the chain or actor model 140 to perform other actions. For example, translator blocks could be divided into two actors, one of which formats a data message according to a meta-data scheme and the other of which formats the data message of the first actor into a packet of a particular packet based protocol to send that message over the network 16.

As will be understood, the use of the actor based model discussed herein provides for uni-directional messaging, enables the use of self-describing messaging protocols and enables asynchronous operation of the various logical elements in the control system, which provides the reactive advantages discussed above to applications executed within the control system 10. For example, using this actor based model enables a user to update translator blocks independently from control blocks. This feature enables a user or system to change or reconfigure translator blocks whenever a data protocol or a data messaging format is changed (e.g., when a new update is provided for a packet based messaging protocol is implemented) without having to touch or reconfigure the control blocks (e.g., the control block communications). On the other hand, this feature enables control blocks to be updated or changed (e.g., to change or update the proprietary operation of these blocks) without needing to change the data messaging or translator blocks. This feature then enables reconfiguration activities to be centered on the actors associated with the change without reconfiguring other actors that have functionality not directly associated with the change. This operation makes configuration of the system 10 easier and more isolated, making errors easier to detect and correct, and makes the system or the applications within the control more resilient to errors.

As mentioned earlier, the control system architecture described herein can easily handle both the changes in workload and failures of components. In particular, there are many different types of errors and problems that can arise when dealing with a relatively complex control system. Some examples include hardware failures, software failures, network connection failures, maintenance failures, and excessive processing failures.

Generally speaking, hardware failures occur when a physical component of a compute node hosting an application or logical entity fails. This failure covers the case whereby a node which is hosting a number of (for example, sensor) actors fails. Typically, hardware failures include the likes of hard drive failures, processor failures, etc. In the case of a hardware failure, the system (e.g., the hypervisor 50 of FIG. 2) can easily migrate the actor (e.g., sensor) representations which are located on that node onto a replacement device or node (e.g., the sensors could be migrated to a backup sensor, a soft sensor, or a failure condition handler). Thus, the actors or other logical entities can be shed to other hardware on the same node or to any combination of hardware on other nodes in the control system 10. Here, the front-end nodes may correctly redirect the messages while also not being concerned with the internals of these messages because the messages are addressed to other actors, not to hardware specific locations. Thus, the supervisor or hypervisor 50 of FIG. 2 for example can move component such as control routines, virtual controllers, translation services, etc. from one hardware device (or to different memories or processors within a hardware device) without needing to reconfigure the routine, the controller, the translator, and in particular without needing to reconfigure the communications of the component being moved (as the communications as described herein enable or set up hardware location independence).

Software failures occur when an illegal operation occurs and leads to the software throwing an unhandled exception. This type of failure includes general purpose cases whereby the application is at fault, for example, if an application is unable to access a database it is in charge of connecting to or if the application tries to divide by zero. To handle this type of failure, the system includes a supervisor (e.g., the hypervisor 50) that monitors the individual sensors or applications and ensures that, in the event of a failure, the actor is brought back to a known working state, typically by restarting the actor or representation.

Network connection failures occur when machines are unable to communicate with each other as a result of router, switch or other network hardware failures. Likewise, environmental maintenance routine failures may include running a number of potentially long running tasks such as collecting a very large amount of data from the data historian. In all of these cases, the failure take resources away from the application, which could pause the application. While this later situation is not normally regarded as a failure, it can appear to other machines as a failure because the application may not respond to heartbeat requests in sufficient time. To correct for this type of failure, the system may include a supervisor (e.g., the hypervisor 50 of FIG. 2) that ensures that the actor or representation is moved to a location where it has more processing power available.

Moreover, an excessive processing failure may occur when an actor (e.g., a sensor) requires more processing than others. For example, one sensor actor may generate readings more frequently than once every second, which has a knock-on effect on the processing duration. In this case, the system does not want to starve other sensor actors of processing time, as doing so would prevent these other sensors from remaining responsive. To be able to handle this type of failure, the system includes a supervisor (e.g., the hypervisor 50 of FIG. 2) that ensures that the sensor or other actor can be moved to a location where it has more processing power available to it, whether this is a machine in its own dedicated thread or a completely different machine all together.

In some cases, the BFN I/O controller hardware may utilize a dual-core processor, wherein one of the cores is used for fast control activities (e.g., 10 ms and 20 ms execution) and the other core is used for everything else (e.g., I/O, message handling, 50 ms and 100 ms control execution, etc.) The BFN I/O controller carrier may support redundant hardware BFNs and the carrier provides connections to the I/O base-plates. Likewise, the fast control activities may operate at an execution speed or rate that is, for example, at least five or at least ten times greater than the execution rate of the virtual controllers in the advanced function nodes 14.

Figure 6:
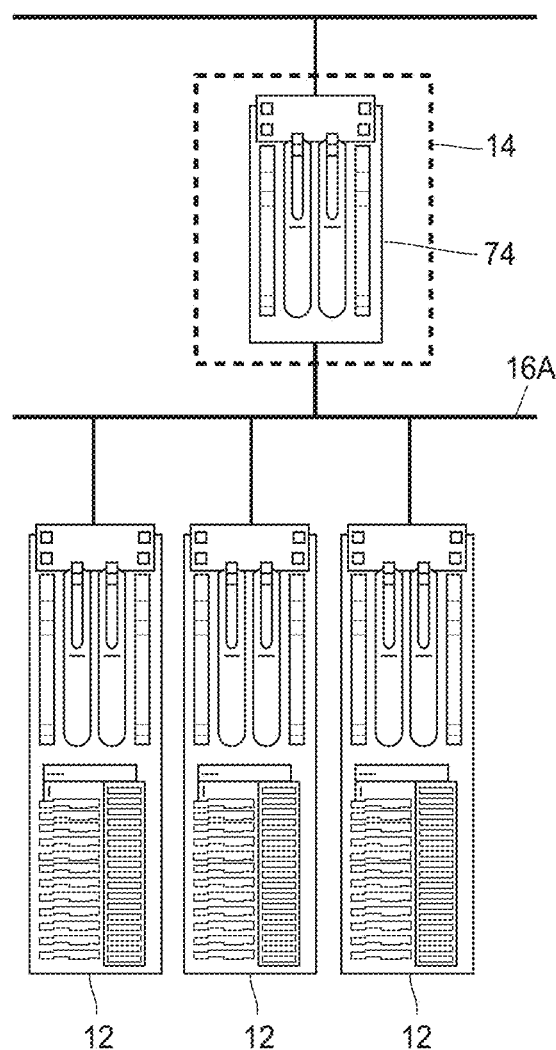
FIG. 6 is a diagram of a local fast control network that can be implemented in the control systems of FIGS. 1 and 2, including multiple fast BFN I/O controllers coupled to a single control translator within a single advanced function node.

In another example, the control architecture described herein may perform fast control and slow control activities simultaneously and still assure that both or that all control speeds are accommodated and performed at the rated speed. FIG. 6 illustrates an example fast control network including three BFN I/O controllers 12 which are connected via an Ethernet local fast control network 16A. All of the BFN I/O controllers 12 are coupled to, in this example, one BFN controller translator 74 that may be within an advanced function node 14 and that share the same local fast control network. The BFN controller translator 74 and the BFN I/O controllers 12 communicate configuration, parameter changes, and control data over the local fast control network 16A. The BFN I/O controllers 12 also communicate fast parameters and input data to other BFNs over the local fast control network 16A. Each BFN I/O controller 12 broadcasts its slow parameters and input data at 50 ms intervals and, it will be noted, that the BFN control execution is not synchronized with fast parameter transfers between the BFN I/O controllers 12. In this case, to assure that the fast control parameters are communicated on the fast control network 16A at the rated speed, the fast control network may be or may include a time sensitive network (TSN) with a TSN switch that priorities the fast control messages on the bus to assure that these messages are communicated via the bus at the fast rate (e.g., 10 ms or 20 ms). The use of a TSN switch in the network 16 to form a fast control network link 16A is desirable to enable both fast and slow control over the same network between the BFN I/O controllers 12 and the advanced function nodes 14.

In one case, the BFN control modules (which may be traditional modules or actors in the actor based model described above) execute in the active BFN I/O controllers 12. The BFN I/O controllers 12 use the local inputs as well as fast parameters received from the local fast control network 16A as the input data to the BFN control modules or actors. At the end of control execution, the control subsystems write output values to the local I/O subsystem (e.g., connected to the field devices) and queues I/O data and fast parameter data for transfer across the local fast control network 16A either once every 10 s (for fast parameter data) or once every 50 ms (for slow parameter data). These times are, of course, examples only and other timing could be used.

Figure 7:
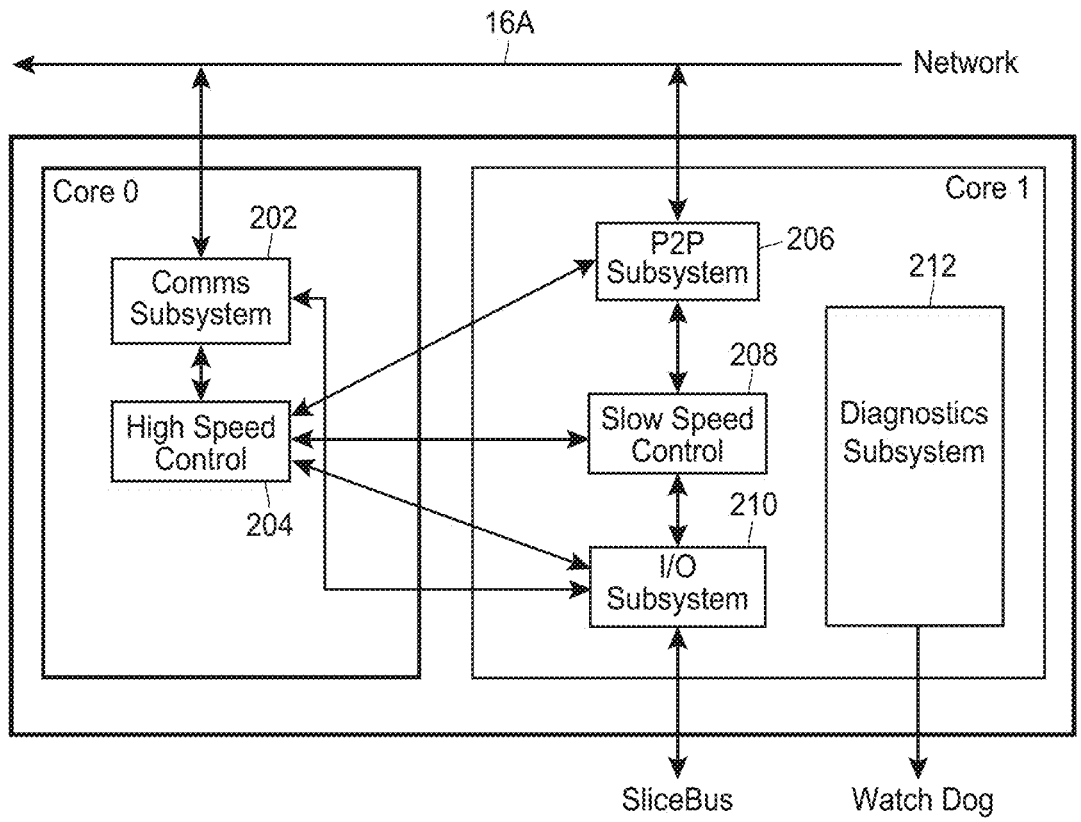
FIG. 7 is block diagram of an example architecture for distributing tasks within a multi-core processor of a BFN I/O controller on the local fast control network of FIG. 6.

To perform fast control at the BFN I/O controllers 12, each controller 12 may include two cores or processors which are used for high speed and medium speed (or slow) control. FIG. 7 illustrates one manner of dividing tasks between these two cores (Core 0 and Core 1) to perform fast and slow control. In this example, Core 0 is used for fast control and Core 1 is used for slow control. The synchronized nature of I/O scanning and control execution allows for control performance of 10 ms and 20 ms screw-to-screw on Core 0 and 50 ms and 100 ms screw-to-screw on Core 1. Control execution rates slower than 100 ms can be executed on the virtual controller 52 in one of the advanced function nodes 14, if desired.

As illustrated in FIG. 7, Core 0 includes a communication subsystem 202 which performs communications on the fast control network 16A and a high speed control block 204 which performs fast computing control activities (e.g., at the 10 or 20 ms cycle rates). The high speed control block of Core 0 is connected to a P2P (peer to peer) subsystem communication block 206, a slow speed control block 208, and an I/O subsystem communication block 210 which are all within Core 1. Moreover, the communication subsystem block 202 may be connected to the I/O system block 210 to allow fast control data to be provided from the I/O subsystem block 210 directly onto the fast control network 16A, or vice versa. The P2P block 206 performs peer to peer communications at the slow control speed or rate (e.g. 50 ms), the slow speed control block 208 performs slow speed control activities (e.g., medium speed control calculations, alarm handling, inter-device communication handling, etc.), and the I/O subsystem block 210 performs communications with the devices (e.g., field devices) in the I/O subsystem. Moreover, a diagnostics subsystem block 212 is executed in Core 1 to perform subsystem diagnostics. This division of tasks between the cores of a multi-core processor in the BFN I/O controllers 12 enables both fast and slow control at the desired rates. Moreover, using a TSN as the fast control network 16A enables both fast and slow control communications with other devices, such as the advanced function nodes 14, which enables some fast control to be performed in the advanced function nodes 14 if desired.

If desired, the BFN I/O controllers 12 may support alert information, for example, hardware alarms, such as ADVISE_ALM, COMM_ALM, FAILED_ALM, and MAINT_ALM. These events are broadcast to an actor responsible for processing event and alarm information. Each of these alarms has the same alarm properties as process alarms (e.g. alarm suppression). Hardware alarms give a general indication of a problem and that diagnostics will be used to further diagnose the exact problem. Example hardware alarms are summarized in Table 1 below.

TABLE 1

Hardware Alarms

| Alarm Type | Condition | Comments |
| --- | --- | --- |
| ADVISE | I/O integrity problem (e.g. open loop, one slice-bus channel bad) | The specific conditions will evolve with the I/O design. An attempt will be made to indicate whether it is an internal condition or a sensor level condition. |
| COMM | No communication with enabled I/O No communication with assigned BFN | |
| FAILED | Detected HW or SW error | |
| MAINT | BFN integrity problem not caused by bad I/O (e.g. failed secondary Local Fast Control Network or I/O bus termination error) | The specific conditions will evolve with the BFN design. |

In one case, during configuration of the control system, each particular BFN I/O controller 12 may be assigned to a virtual controller 52 on the local fast control network 16A and then the controller 12 can be commissioned and configured. The commissioning may be performed through the BFN context menu provided in a configuration application run in a virtual configuration system 70 on the advanced function node 14 or in a client or other compute node, such as one of the workstations 26 of FIG. 1. The EEPROM in the BFN I/O controller card may be used to hold the address, name, download CRCs, and last download time of the BFN I/O controller 12. When the BFN I/O controller 12 powers up, it reads this information to determine if it is in the same position it was in prior to being powered down. If the BFN I/O controller 12 determines it is still commissioned, in the same position, and it has a valid configuration in flash that matches the virtual controller configuration, the BFN I/O controller 12 will transition to the configured state.

Figure 8A:
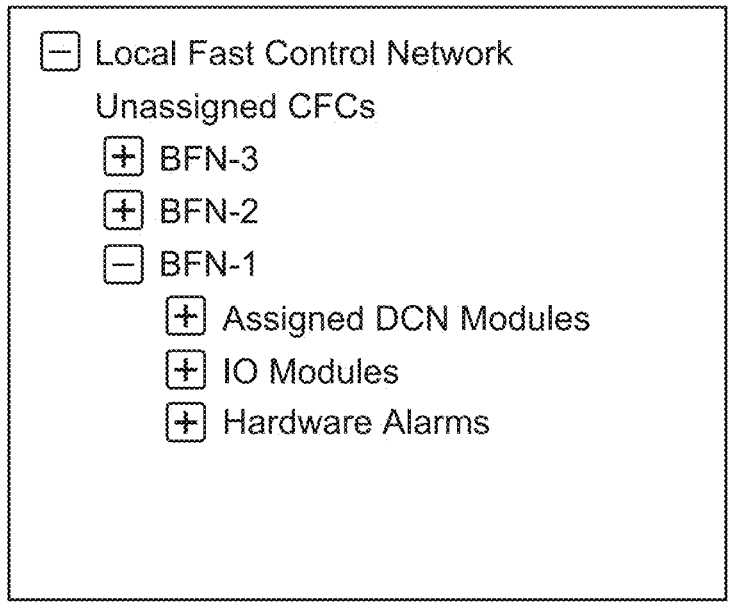
FIG. 8A is an example configuration hierarchy of the local fast control network of FIG. 6.
Figure 8B:
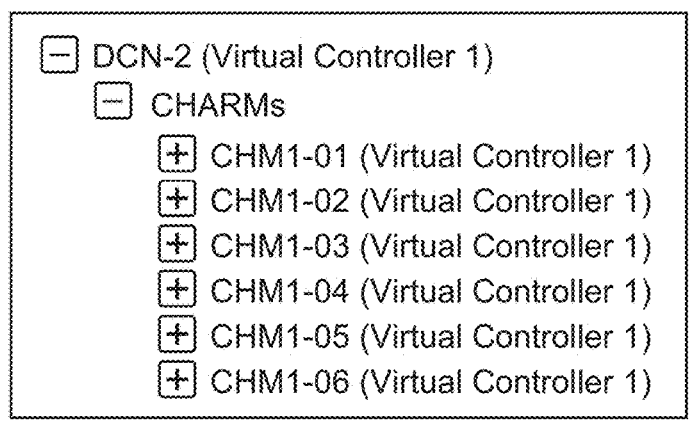
FIG. 8B is a user interface diagram of an example configuration hierarchy of the local fast control network of FIG. 6 showing an assignment of channels to device tags.

As noted above, a BFN I/O controller configuration may be made available through the local fast control network subsystem under a virtual controller 52. FIG. 8A illustrates a screen display of a configuration application depicting an expanded view of a BFN I/O controller network under or as part of a particular virtual controller 52. In this example, three BFN I/O controllers 12 (BFN-1, BFN-2, BFN-3) are illustrated under the local fast control network for a virtual controller 52. It will be noted that the I/O modules subsystem under the BFN-1 includes all configured I/O modules in that BFN. Upon expanding the I/O modules subsystem under a BFN, a user may be presented with all the possible I/O modules that can be enabled under the BFN. Each I/O module may be numbered, i.e., CHM1-01 to CHM1-12 through CHM8-01 to CHM8-12 (8 carriers*12=96 10 Modules per BFN) and the configuration system may enable the user to make the channel or module assignment in this screen. FIG. 8B illustrates an example assignment of channels (CHARMs channels) to device tags. Moreover, the Hardware Alarms for the BFN and its I/O modules may be defined through the Hardware entry or tab.

Still further, the Local Fast Control Network context menu may allow for new BFN I/O controller place-holders to be created. Unassigned BFNs that are physically connected to the virtual controller may be shown in the Unassigned BFNs content view. The format of the Unassigned BFNs may show the type, model, and revision of the unassigned BFNs. Still further, the BFNs in the Unassigned BFNs may be assigned into created place-holders either by drag-and-drop or context menu selections from the BFN menu. The BFNs should be physically present in order to perform an assignment. When the assignment is made, the virtual controller receives basic identification information to create its corresponding device module including its name and address. The identification information is used in I/O data and in fast parameter publishing to uniquely identify the source of the data.

In one example, upon recovery of a non-functioning BFN I/O controller, if the BFN I/O controller detects that it is still commissioned, in the same position, and with the same configuration the virtual controller has, then the configuration is copied from the local cold restart memory into the runtime configuration memory, the I/O Modules are downloaded, and control execution begins. Still further, the BFN I/O controller may support total downloads and there may or may not be an ability for the user to download individual I/O modules. In the total download case, the BFN I/O controller may process the download and determine which components have changed to minimize the disturbance effects of the download (i.e. it is "total matching" download). If only one control strategy (module) or I/O module has changed, for example, then only that item is updated. The BFN I/O controller may configure all I/O modules that have changed in the download. If the BFN I/O controller ever detects that an I/O module has re-established lost communications with it, the BFN I/O controller may send the necessary configuration sequence to the module to bring the module back online. This provides for failure recovery.

Moreover, the BFN I/O controller may support any number and types of I/O modules including input modules and output modules. In one example, a total of 96 I/O modules of the types described below may be supported. In particular, example BFN I/O input modules that may be supported are summarized in Table 3.

TABLE 3

| BFN Input JO Module Types | | |
| --- | --- | --- |
| Class | Hardware Type | Functionality |
| Analog Input (AI) | AI 4-20 mA HART I/O Module<br>AI 4-20 mA HART (Intrinsically Safe) I/O Module<br>AI Generic I/O Module | HART Analog Input 4-20 mA<br>Analog Input 4-20 mA<br>Analog Input 0-20 mA |
| Discrete Input (DI) | DI NAMUR I/O Module<br>DI 24 VDC Low-Side I/O Module<br>DI 24 VDC Isolated I/O Module<br>DI 120 VAC Isolated I/O Module<br>DI 230 VAC Isolated I/O Module<br>IS DI NAMUR I/O Module<br>DI Generic I/O Module | Discrete Input<br>Pulse Count Input |
| Thermocouple_mv | LS Thermocouple/mV I/O Module<br>LS Thermocouple/mV (Intrinsically Safe) IO Module<br>LS Thermocouple/mV Generic I/O Module | Type B Thermocouple Input<br>Type E Thermocouple Input<br>Type J Thermocouple Input<br>Type K Thermocouple Input<br>Type N Thermocouple Input<br>Type R Thermocouple Input<br>Type S Thermocouple Input<br>Type T Thermocouple Input<br>±20 Millivolt Input<br>±50 Millivolt Input<br>±100 Millivolt Input |
| RTD Input | LS RTD/Resistance Input IO Module<br><br>LS RTD/Resistance Input (Intrinsically Safe) IO Module<br>LS RTD Generic I/O Module | Pt 100 RTD Input<br>Pt 200 RTD Input<br>Pt 500 RTD Input<br>Pt 1000 RTD Input<br>Ni 120 RTD Input<br>Ni 100 RTD Input<br>Ni 200 RTD Input<br>Ni 500 RTD Input<br>Ni 1000 RTD Input<br>Cu 10 RTD Input<br>Resistance RTD Input |

TABLE 3-continued

BFN Input IO Module Types

| Class | Hardware Type | Functionality |
|---|---|---|
| Voltage | LS AI 0-10 VDC Isolated I/O Module<br>LS AI 0-10 Generic I/O Module | 0 to 5 Volt Input<br>0 to 10 Volt Input<br>1 to 5 Volt Input<br>−1 to +1 Volt Input<br>−5 to +5 Volt Input<br>−10 to +10 Volt Input |
| Power | LS 24 VDC Power I/O Module | 24 VDC Power |

Example BFN I/O output modules that may be supported are summarized in Table 4.

TABLE 4

BFN Output IO Module Types

| Class | Hardware Type | Functionality |
|---|---|---|
| Analog Output (AO) | AO 4-20 mA HART I/O Module<br>AO 4-20 mA HART (Intrinsically Safe) I/O Module<br>AO Generic I/O Module | HART Analog Output 4-20 mA<br>Analog Output 4-20 mA<br>Analog Output 0-20 mA |
| Discrete Output (DO) | DO Generic I/O Module<br>DO 100 mA Energy Limited I/O Module<br>DO 24 VDC High-Side I/O Module<br>DO 24 VDC Isolated I/O Module<br>DO VAC Isolated I/O Module<br>IS DO 45 mA I/O Module | Discrete Output<br>Momentary Output<br>Continuous Pulse Output |

Figure 9:
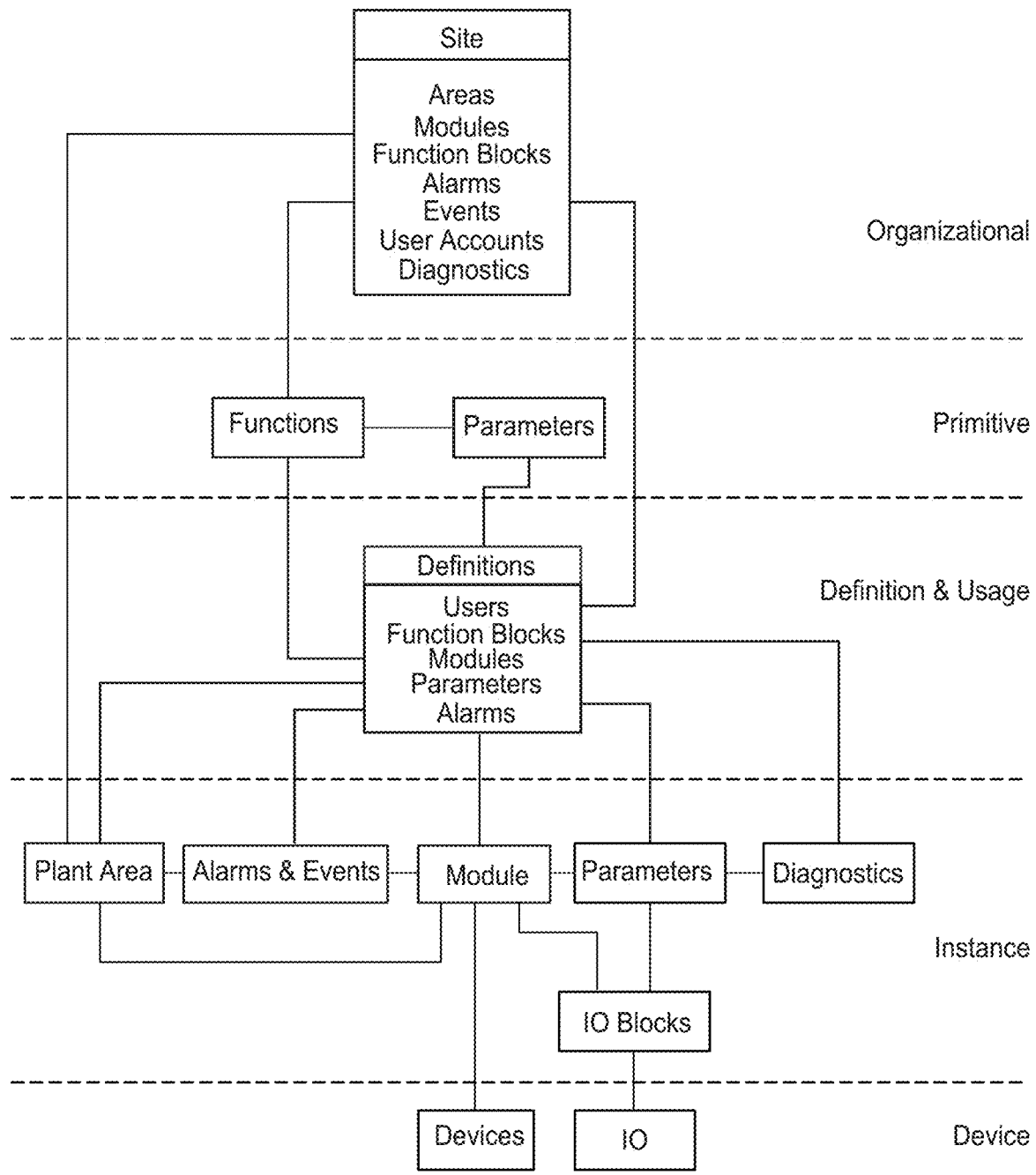
FIG. 9 is a diagram of a logical structure of elements within a process control system used to perform control functions.

Still further, the BFN controller translator service 74 (of FIG. 2) in combination with OPC-UA service 68 (of FIG. 2), may provide an OPC mapping to the BFN I/O controller. One example of this mapping is illustrated with respect to FIGS. 9-11. In FIG. 9, the organizational components include all of the named items in the control system 10. Examples, as shown in the diagram of FIG. 9, include areas and control strategies (control modules). Primitive are made up of function block definitions and parameter definitions. Definitions and usages define the interfaces to function blocks, control strategies, parameters, and alarms. Instances include specific tagged items such as a specific device or an I/O channel. Devices include controllers, I/O modules, and smart devices, such as HART devices.

Figure 10:
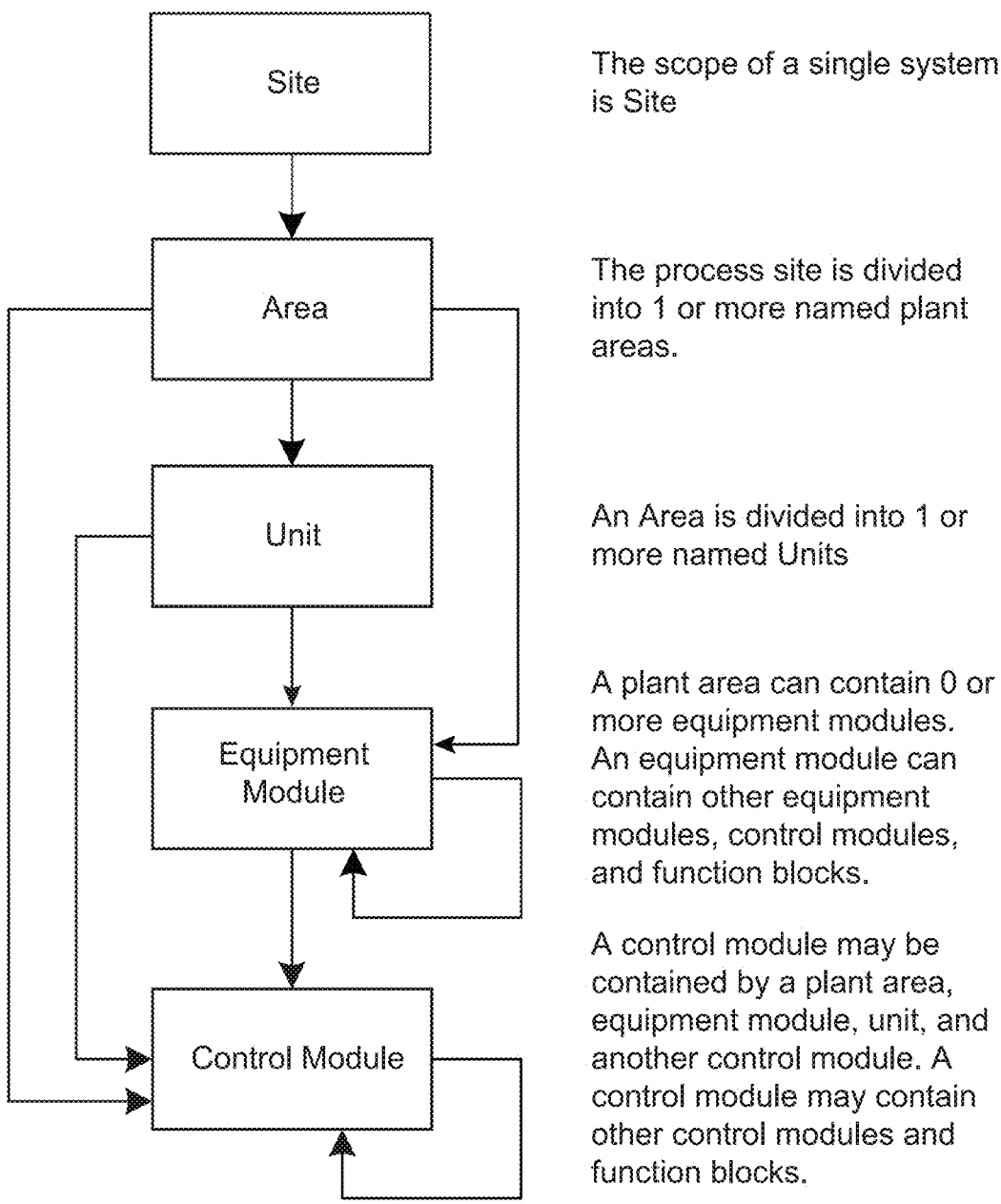
FIG. 10 is a general hardware protocol diagram of a control network conforming to the S88 standard.
Figure 11:
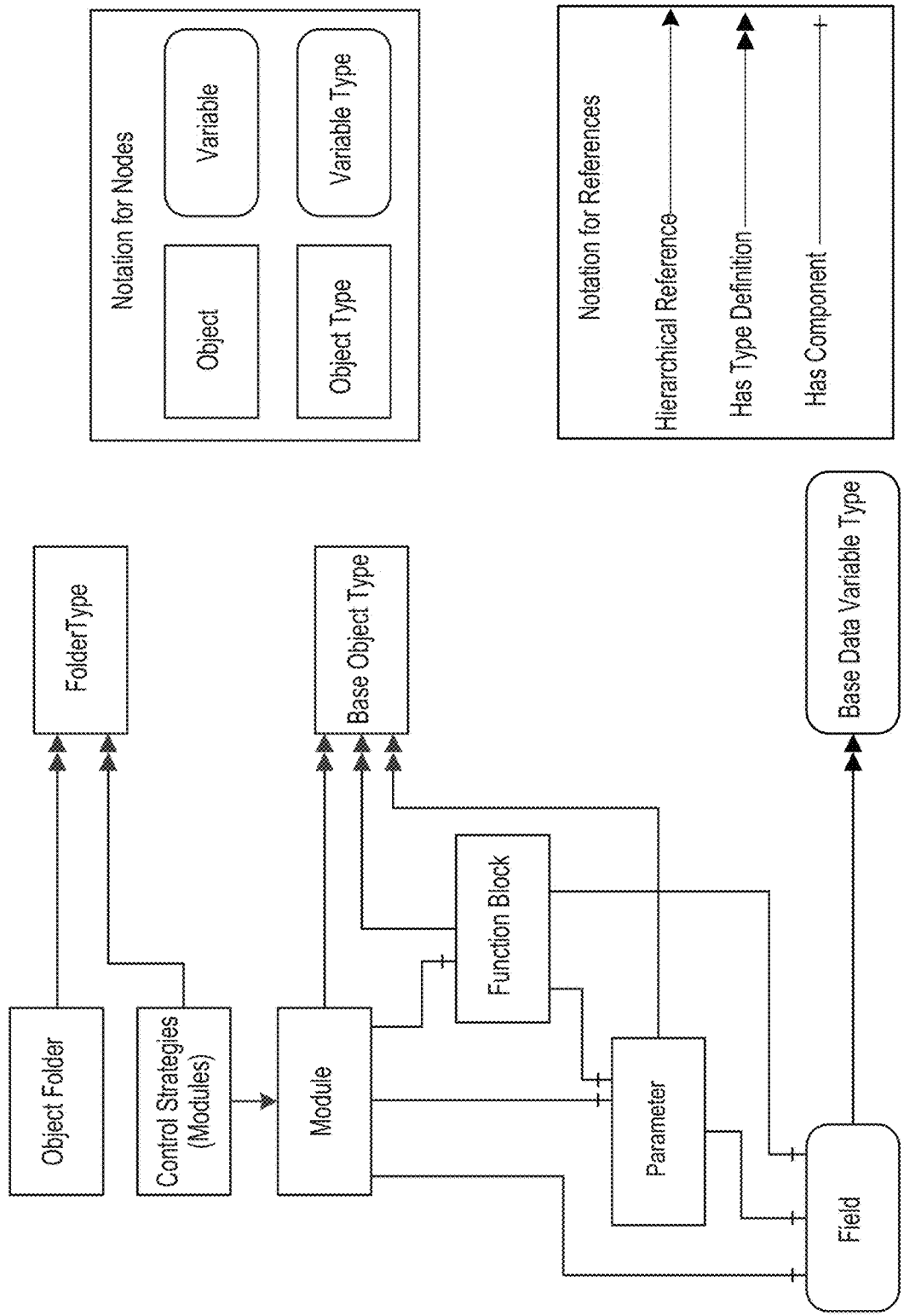
FIG. 11 is a data diagram illustrating a data conversion method or scheme for use with the logical and hardware diagrams of FIGS. 9 and 10 to conform data to the OPC-UA protocol which may be used with the self-describing message protocol used by the control system of FIGS. 1 and 2.

Moreover, the control strategies may follow an ANSI/ISA-88 model as depicted in FIG. 10. Here, alarms and events are tied to this structure. As a result, the mapping layer provides an interface from control strategies (modules) to objects that can be browsed and accessed through OPC-UA. One example of a basic object model for this mapping is illustrated in FIG. 11. It should be noted that the mappings of FIGS. 9-11 may be used to provide meta-data messages for the self-describing message protocol described above.

Still further, the virtual controller 52 executes control strategies (e.g., control modules), provides an interface from the DCS to the BFN I/O controllers 12, and may support a Modbus/TCP connection. To simplify configuration and operations, shadow modules may be used to shadow high-speed modules executing in BFN I/O controllers 12.

Figure 12:
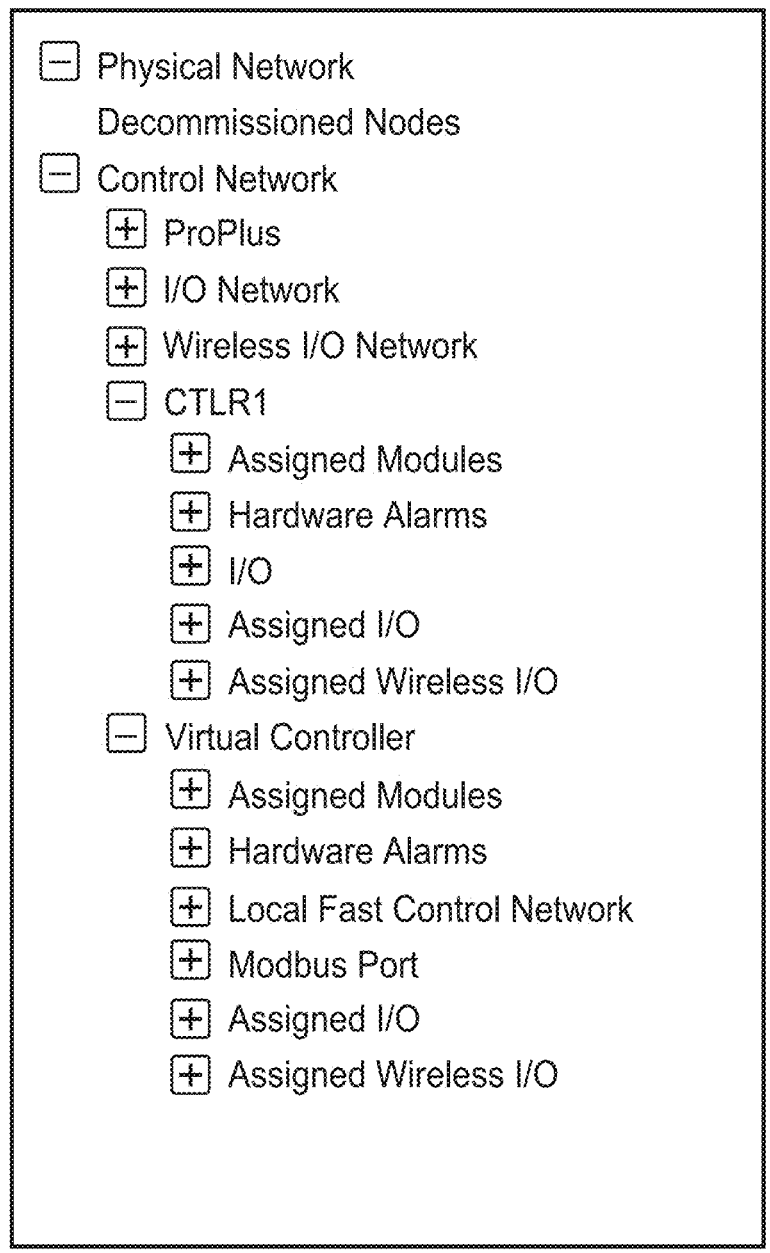
FIG. 12 is user interface diagram of an example configuration hierarchy of the set of control nodes including a traditional controller and a virtual controller associated with an advanced function node of the control system of FIGS. 1 and 2.

During configuration, the configuration application (e.g., the virtual configuration application 70 of FIG. 2) may provide a context menu selection on the control network that includes the ability to add virtual controllers. FIG. 12 illustrates an example configuration screen that may be presented to a user by a configuration application or device that illustrates a virtual controller in an explorer view under a control networks item in the hierarchy.

In this case, the Assigned Modules tab shows control modules assigned to that controller. The Hardware Alarms types may be ADVISE, COMM, FAILED, and MAINT. The Local Fast Control Network subsystem is where BFN I/O controllers will appear. Moreover, the Assigned I/O and Assigned Wireless I/O hold the remote I/O assignments from Remote I/O, WIOCs, and other devices (not required for the Open Control System Prototype).

In one example, the virtual Ethernet BFN 54 of FIG. 2, provides a platform to access data from intelligent field devices. The virtual Ethernet BFN 54 allows access to intelligent device data to support the collection of history data, alarming, and limited control and may support any desired protocols, such as Modbus TCP and EtherNet/IP. The supporting DCS configuration allows ports with physical and logical devices under the port to be defined. The logical devices may contain signals that define the specific data items in the devices to be accessed. The device data may then be mapped into control strategy (module) parameters through device signal tags (DSTs). The port, devices, and signals may have configuration properties that are different depending on the protocol. In one example the function block capability of modules in the virtual Ethernet BFN 54 are structured to support motor control and supervisory control but may be structured to support analog and advanced control. In one case, the virtual Ethernet BFN 54 may not be able to reference any other I/O directly and so I/O may not be able to be assigned to a virtual Ethernet BFN 54. Still further, device data may only be able to be referenced within the virtual Ethernet BFN 54 connected to the device, i.e., the device data cannot be externally referenced directly from another controller.

Figure 13:
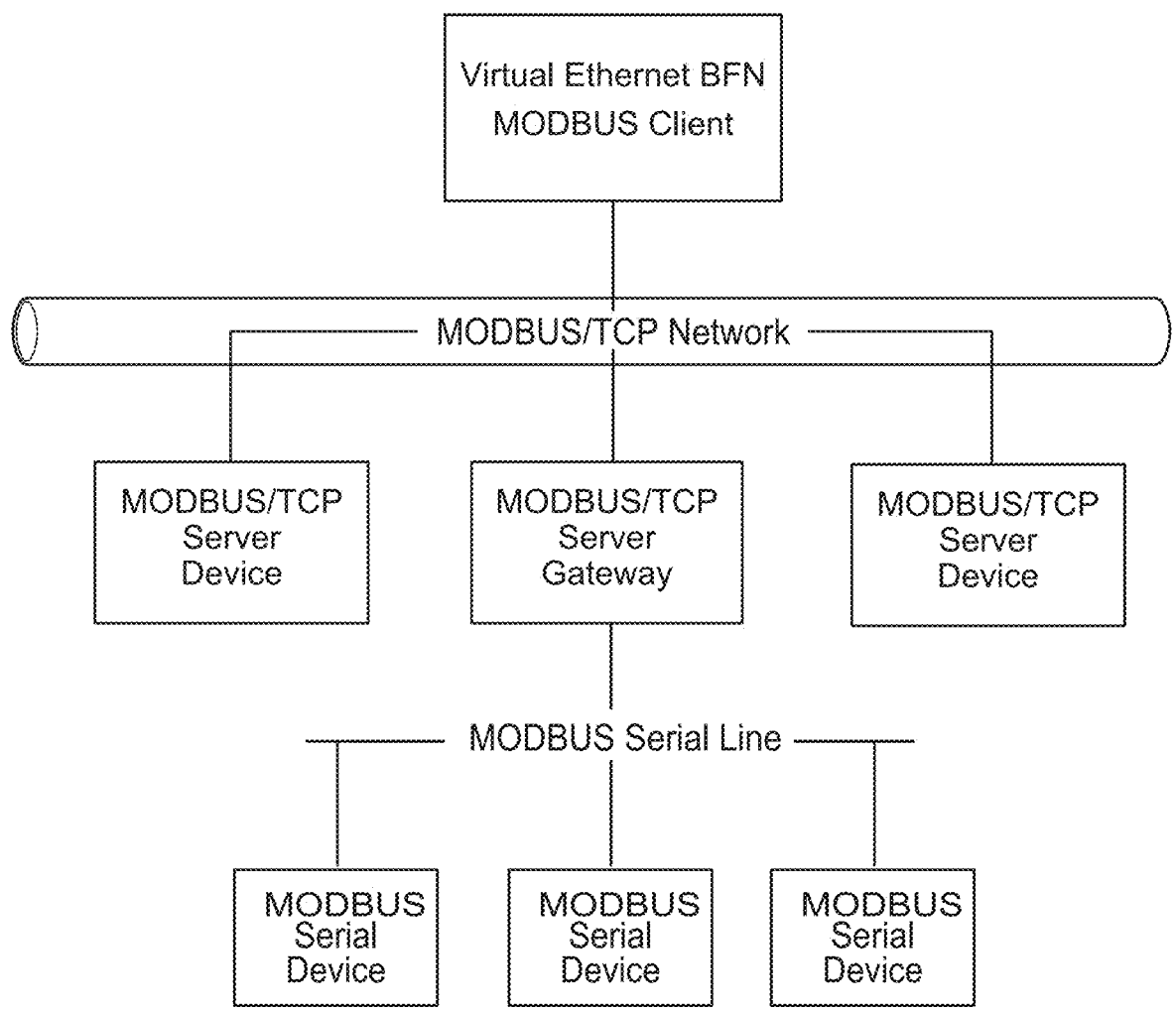
FIG. 13 illustrates an example Modbus sub-network that may be coupled to a virtual Ethernet BFN Modbus controller in an advanced function node of FIG. 2.

Moreover, a Modbus TCP interface enables Modbus data sources, such as programmable logic controllers (PLCs), drives, motor control centers (MCCs), analyzers and similar devices communicating Modbus TCP to be integrated in the control system 10. The Modbus TCP interface may be a Modbus client (master) reading and writing data from/to Modbus servers (slave devices). The Modbus server devices can be direct Modbus TCP devices or Modbus serial devices under a Modbus TCP gateway as illustrated in FIG. 13. Of course, any of the many available Modbus TCP gateways may be used.

Still further, an EtherNet/IP (EIP) interface may enable EIP data sources such as PLCs, variable-speed drives, MCCs, analyzers, sub-sea devices, and similar devices communicating EIP to be integrated in the control system. The EIP interface may be an EIP I/O scanner reading and writing data from/to EIP I/O adapters and other scanners. Typical ring, star, and linear topologies may be used with the EIP interface network.

The virtual controller 52 may store one or more BFN control strategies (modules) and may provide the online view and access to parameter data through shadow modules that are running in the virtual controller 52 to which the BFN I/O controllers 12 are assigned. When a BFN I/O controller 12 is downloaded, the shadow modules are created from the BFN modules that are running in the BFN I/O controller 12. Moreover, BFN I/O module data may be accessible from any BFN on a local fast control network and the virtual controller 52 itself. Outputs can be driven from a module in the BFN I/O controller 12 that owns the output I/O module. The fast scan cyclic input data may be communicated over the local fast control network at a 50-millisecond rate or faster if desired, and all of the BFN I/O controllers 12 on the network 16 will receive the updates. Other data, such as input data, I/O diagnostics and alert information, and field device protocol data (such as HART data) may be sent to the virtual controller 52 at a slower rate (e.g., 100 ms).

Still further, the hardware that contains the Ethernet communication switches and the I/O Ports (IOPs) may include support to physically isolate the network connections in the virtual controller, the local fast control network, and the control network. Redundant network connections may be supported. Still further, when a BFN I/O module is configured to use data from another BFN I/O module, then the source of the data is considered the fast parameter and the usage of the data is considered the fast parameter reference. Additionally, the non-fast parameters may be used to exchange data between the virtual controllers 52 and the BFN I/O controllers 12. Moreover, when a reference is configured from a virtual controller 52 to a BFN I/O controller 12, then the non-fast parameter mechanism may be used. Likewise, the system 10 may support auto-sensing of I/O modules. If the I/O module type has not been defined at configuration time, then the information is filled in when auto-sensed. If, however, the I/O module type has been entered, and the type auto-sensed does not match, then a reconcile dialog may be shown. The reconcile dialog may also occur when the I/O module does not match what has been configured.

Additionally, the information available at the virtual controller node level may include the diagnostics for the node itself, communications, assigned I/O, assigned modules, restart, redundancy, Modbus, and the local fast control network belonging to the virtual controller. History and trending may be supported through the OPC-UA interface 68 if desired. Alarm detection and time stamping may be performed in the BFN I/O controllers 12 providing for accurate time stamps and alarm data. The alarms from a BFN I/O controller 12 may be in the process category. Asset management may be used to locate, for example, HART and other protocol I/O modules under the virtual controller 52 and BFN I/O controllers 12. Asset management is provided by the virtual AMS device manager 70 of FIG. 2.

When implemented in software, any of the applications, services, virtual devices, vertical machines, virtual entities, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. An industrial control system having a plurality of field devices that perform physical functions within an industrial environment, comprising:
    an input/output node including an input/output processor coupled to the plurality of field devices within the industrial environment;
    one or more virtual controller nodes, each of the one or more virtual controller nodes including one or more processors, a memory, a plurality of virtual controllers stored in the memory, wherein each of the plurality of virtual controllers is executable on the one or more processors to perform control of the field devices within the industrial environment, and a supervisor stored in the memory and executable on the one or more processors to manage the operation of the plurality of virtual controllers at the node; and
    a communication network, that connects the input/output node to each of the one or more virtual controller nodes;
    wherein the input/output processor receives device signals from one or more of the field devices within the industrial environment, processes the device signals and places the processed device signals on the communication network for delivery to one or more of the plurality of virtual controllers and receives control signals from one or more of the plurality of virtual controllers via the communication network, processes the received control signals, and sends the processed control signals to one or more of the field devices in the industrial environment.

2. The industrial control system of claim 1, wherein the one or more virtual controller nodes includes a plurality of virtual controller nodes and wherein one or more of the plurality of virtual controllers of one of the plurality of virtual controller nodes is movable from the one of the plurality of virtual controller nodes to another one of the plurality of virtual controller nodes without reconfiguring the virtual controller communications.

3. The industrial control system of claim 1, wherein the one or more of the plurality of virtual controllers are movable from one location of the memory of a virtual controller node to another location in the memory of the virtual controller node without reconfiguring the virtual controller communications.

4. The industrial control system of claim 1, wherein at least one of the virtual controller nodes includes a plurality of different memory devices and wherein the one or more of the plurality of virtual controllers are movable from one of the plurality of memory devices of the at least one of the virtual controller nodes to another one of the plurality of memory devices of the at least one of the virtual controller nodes without reconfiguring the virtual controller communications.

5. The industrial control system of claim 1, wherein the input/output node includes a virtual input/output routine coupled to a physical input/output device in the industrial environment to receive device signals from field devices via the physical input/output device in the industrial environment.

6. The industrial control system of claim 1, wherein the input/output node includes a virtual input/output routine coupled to receive device signals directly from field devices in the industrial environment, wherein the virtual input/output routine executes on a general purpose processor within the input/output node to perform input/output signal processing on device signals from the field devices and on control signals delivered to the field devices.

7. The industrial control system of claim 1, wherein the input/output node includes a virtual input/output routine that communicates device signals to the one or more of the plurality of virtual controllers in the virtual controller nodes using a self-describing communication scheme.

8. The industrial control system of claim 1, wherein the input/output node includes a virtual input/output routine that communicates device signals via the communication network to the one or more of the plurality of virtual controllers using a plurality of different communication protocols.

9. The industrial control system of claim 1, wherein the input/output node includes a virtual input/output routine that communicates device signals to the one or more of the plurality of virtual controllers using a hardware location independent communication addressing scheme.

10. The industrial control system of claim 1, wherein the input/output node further includes a control routine stored on the memory of the input/output node and that executes on the processor of the input/output node to use one or more of the device signals to produce one or more control signals for controlling one of the field devices in the industrial environment.

11. The industrial control system of claim 10, wherein the one or more of the plurality of virtual controllers in the one or more virtual controller nodes perform control routine executions at or less than a first rate, and wherein a control routine in the input/output node performs control routine executions at a second rate greater than the first rate.

12. The industrial control system of claim 11 wherein the second rate is equal to or greater than five times the first rate.

13. The industrial control system of claim 1, wherein the input/output node includes a virtual input/output communication routine that multiplexes device signals onto the communication network.

14. The industrial control system of claim 1, wherein the input/output node includes a virtual input/output communication routine that receives device signals from a plurality of field devices, via a plurality of different communication protocols, and that multiplexes the device signals on the communication network using a self-describing communication scheme.

15. The industrial control system of claim 1, wherein the input/output node includes a virtual input/output communication routine that receives device signals from a plurality of field devices via a plurality of different communication protocols and multiplexes the device signals onto the communication network within the plurality of different communication protocols and using a self-describing communication scheme.

16. The industrial control system of claim 15, wherein the self-describing communication scheme includes device signal data including the device signals in a first communication protocol and protocol description signals describing the first communication protocol.

17. The industrial control system of claim 1, wherein the supervisor of the virtual controller nodes performs load balancing of the processors in the virtual controller node.

18. The industrial control system of claim 1, wherein the supervisor of at least one of the virtual controller nodes is configured to move a virtual controller from one processor to another processor at the virtual controller node without reconfiguring the virtual controller communications for the virtual controller.

19. An industrial control system having a plurality of field devices that perform physical functions within an industrial environment, comprising:
  an input/output node including an input/output processor coupled to the plurality of field devices within the industrial environment via one or more communication channels;
  a plurality of controller nodes, each of the controller nodes including one or more processors, a memory, a plurality of controllers stored in the memory, wherein each of the plurality of controllers is executable on the one or more processors to perform control of the field devices within the industrial environment, and a supervisor stored in the memory and executable on the one or more processors to manage the operation of the plurality of controllers at the controller node; and
  an open protocol communication network, that connects the input/output node to each of the one or more controller nodes using an open communications protocol;
  wherein the input/output processor receives device signals from one or more of the field devices within the industrial environment, places the device signals on the communication network using an open communications protocol for delivery to one or more of the plurality of controllers and receives control signals from one or more of the plurality of controllers via the communication network and sends the control signals to one or more of the field devices in the industrial environment.

20. The industrial control system of claim 19, wherein the open protocol communication network is an Ethernet communication network.

21. The industrial control system of claim 19, wherein the open protocol communication network uses a TCP/IP packet based network communication scheme.

22. The industrial control system of claim 19, wherein one of the controller nodes is a virtual controller node that includes a plurality of virtual controllers that are movable from a first one of the processors to a second one of the processors at the one of the controller nodes.

23. The industrial control system of claim 19, wherein the input/output node communicates device signals to one or more of the plurality of controllers in the controller nodes using a self-describing communication scheme.

24. The industrial control system of claim 19, wherein the input/output node communicates device signals to one or more of the plurality of controllers at the controller nodes by sending data in a plurality of different communication protocols via packets configured according to the open communications protocol.

25. The industrial control system of claim 19, wherein the input/output node communicates device signals to one or more of the plurality of controllers at the controller nodes using a hardware location independent communication addressing scheme.

26. The industrial control system of claim 19, wherein the input/output node includes an input/output communication routine that multiplexes device signals configured in different communication protocol schemes onto the open protocol communication network.

27. The industrial control system of claim 19, wherein the input/output node includes an input/output communication routine that receives device signals from the plurality of field devices, via a plurality of different communication protocols, and that multiplexes the device signals on the communication network using a self-describing communication scheme.

28. The industrial control system of claim 27, wherein the self-describing communication scheme includes device signal data including the device signals in a first communication protocol and protocol description signals describing the first communication protocol.

29. An industrial control system having a plurality of field devices that perform physical functions within an industrial environment, comprising:
   an input/output node including an input/output processor coupled to the plurality of field devices within the industrial environment via one or more communication channels;
   a plurality of controller nodes, each of the controller nodes including one or more processors, one or more memories, a plurality of controllers stored in the one or more memories, wherein each of the plurality of controllers is executable on the one or more processors to perform control of the field devices within the industrial environment; and
   a communication network, that connects the input/output node to each of the one or more controller nodes;
   wherein the input/output processor receives device signals from one or more of the field devices within the industrial environment, and places the device signals on the communication network using a hardware location independent communication addressing scheme.

30. The industrial control system of claim 29, wherein the hardware location independent communication addressing scheme comprises a self-describing communication scheme.

31. The industrial control system of claim 30, wherein the self-describing communication scheme includes device signal data including the device signals in a first communication protocol and protocol description signals describing the first communication protocol.

32. The industrial control system of claim 30, wherein the self-describing communication scheme includes device signal data including the device signals in a first communication protocol and protocol description signals describing the first communication protocol with respect to one of the field devices and includes device signal data including the device signals in a second communication protocol and protocol description signals describing the second communication protocol with respect to a second one of the field devices.

33. The industrial control system of claim 30, wherein communication network is an open protocol communication network.

34. The industrial control system of claim 33, wherein the open protocol communication network uses a TCP/IP packet based network communication scheme.

35. The industrial control system of claim 29, wherein one of the controller nodes is a virtual controller node that includes a plurality of virtual controllers that are movable from a first one of the processors to a second one of the processors at the one of the controller nodes.

36. The industrial control system of claim 35, wherein the input/output node communicates device signals to the virtual controllers by sending data in a plurality of different communication protocols via packets configured according to a self-describing communications scheme.

37. The industrial control system of claim 29, wherein the input/output node includes an input/output communication routine that multiplexes device signals configured in different communication protocol schemes onto the communication network using the hardware location independent communication scheme.

38. The industrial control system of claim 29, wherein the input/output node includes an input/output communication routine that receives device signals from a plurality of field devices, via a plurality of different communication protocols, and that multiplexes the device signals on the communication network using a self-describing communication scheme.

39. The industrial control system of claim 29, wherein controller nodes send control signals over the communications network using a hardware location independent communication addressing scheme.

40. The industrial control system of claim 1, wherein each of the plurality of virtual controllers is configured to communicate with a compute node via the communication network.

41. The industrial control system of claim 19, wherein each of the plurality of controllers is configured to communicate with a compute node via the open protocol communication network.

42. The industrial control system of claim 29, wherein each of the plurality of controllers is configured to communicate with a compute node via the communication network.

* * * * *